United States Patent
Olvera-Hernandez et al.

(10) Patent No.: US 12,557,179 B2
(45) Date of Patent: Feb. 17, 2026

(54) METHODS AND APPARATUS FOR HANDLING MTC LONG DRX CYCLE/SLEEP LENGTHS

(71) Applicant: InterDigital Patent Holdings, Inc., Wilmington, DE (US)

(72) Inventors: Ulises Olvera-Hernandez, Saint-Lazare (CA); Ghyslain Pelletier, Montreal (CA); Peter S. Wang, E. Setauket, NY (US); Kai Liu, Dublin, OH (US); Guanzhou Wang, Brossard (CA); Marian Rudolf, Montreal (CA); Samian Kaur, Plymouth Meeting, PA (US); Michael F. Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 201 days.

(21) Appl. No.: 18/493,890

(22) Filed: Oct. 25, 2023

(65) Prior Publication Data

US 2024/0057214 A1    Feb. 15, 2024

Related U.S. Application Data

(63) Continuation of application No. 17/246,199, filed on Apr. 30, 2021, now Pat. No. 11,856,639, which is a
(Continued)

(51) Int. Cl.
*H04W 76/28* (2018.01)
*H04W 4/70* (2018.01)
*H04W 52/02* (2009.01)

(52) U.S. Cl.
CPC ............ *H04W 76/28* (2018.02); *H04W 4/70* (2018.02); *H04W 52/0216* (2013.01); *Y02D 30/70* (2020.08)

(58) Field of Classification Search
None
See application file for complete search history.

(56) References Cited

U.S. PATENT DOCUMENTS

| | | | | |
|---|---|---|---|---|
| 2007/0291673 A1* | 12/2007 | Demirhan | ......... | H04W 52/0216 370/311 |
| 2008/0186892 A1* | 8/2008 | Damnjanovic | ... | H04W 52/0216 370/311 |

(Continued)

FOREIGN PATENT DOCUMENTS

| | | |
|---|---|---|
| CN | 101473563 A | 7/2009 |
| CN | 101690348 A | 3/2010 |

(Continued)

OTHER PUBLICATIONS

3rd Generation Partnership Project, "Extended Paging Cycles", Nokia Siemens Networks, Nokia, Ericsson, ST-Ericsson, Interdigital, S2-112592, 3GPP TSG SA WG2 Meeting #85, Xi'an, China, May 16-20, 2011, pp. 1-3.

(Continued)

*Primary Examiner* — Yaotang Wang
(74) *Attorney, Agent, or Firm* — Flaster Greenberg, P.C.

(57) ABSTRACT

Current wireless networks do not allow machine type communication (MTC) devices to have long discontinuous reception (DRX) cycles or sleep lengths. A long DRX cycle may allow MTC systems and devices to operate with much longer DRX/Sleep cycles/periods. This may facilitate the MTC operations for infrequent system access or infrequent system reaching (e.g. paged once in a week) with no or low mobility and may allow MTC devices to sleep for a long time with low power consumption.

19 Claims, 15 Drawing Sheets

Related U.S. Application Data continuation of application No. 16/010,759, filed on Jun. 18, 2018, now Pat. No. 11,032,870, which is a continuation of application No. 13/829,642, filed on Mar. 14, 2013, now abandoned.

(60) Provisional application No. 61/653,706, filed on May 31, 2012, provisional application No. 61/644,922, filed on May 9, 2012.

(56) References Cited

U.S. PATENT DOCUMENTS

| | | | |
|---|---|---|---|
| 2009/0275368 A1* | 11/2009 | Wang | H04W 28/09 |
| | | | 455/574 |
| 2010/0014674 A1 | 1/2010 | Lin | |
| 2010/0130237 A1 | 5/2010 | Kitazoe et al. | |
| 2010/0184458 A1* | 7/2010 | Fodor | H04W 52/0216 |
| | | | 455/574 |
| 2010/0202382 A1* | 8/2010 | Park | H04L 5/0053 |
| | | | 370/252 |
| 2010/0248752 A1* | 9/2010 | Yu | H04W 72/23 |
| | | | 455/458 |
| 2010/0272004 A1 | 10/2010 | Maeda et al. | |
| 2012/0082077 A1 | 4/2012 | Zhang et al. | |
| 2012/0264483 A1* | 10/2012 | Chin | H04W 68/00 |
| | | | 455/552.1 |
| 2012/0269173 A1 | 10/2012 | Chin et al. | |
| 2012/0300685 A1 | 11/2012 | Kim et al. | |
| 2013/0109391 A1 | 5/2013 | Lee et al. | |
| 2013/0215809 A1 | 8/2013 | Chang et al. | |
| 2015/0005018 A1* | 1/2015 | Klatt | H04W 76/28 |
| | | | 455/458 |

FOREIGN PATENT DOCUMENTS

| | | |
|---|---|---|
| CN | 102098783 A | 6/2011 |
| CN | 102257859 A | 11/2011 |
| CN | 102421148 A | 4/2012 |
| EP | 2587866 A1 | 5/2013 |
| EP | 2739100 A2 | 6/2014 |
| GB | 2483752 A | 3/2012 |
| KR | 2011-0083454 A | 7/2011 |
| TW | 2010-21497 A | 6/2010 |
| TW | 2011-12685 A | 4/2011 |
| WO | WO 2011/087233 A2 | 7/2011 |
| WO | WO 2011/087233 A3 | 12/2011 |
| WO | WO 2011/162039 A1 | 12/2011 |
| WO | WO 2013/149666 A1 | 10/2013 |

OTHER PUBLICATIONS

3rd Generation Partnership Project, "Introduction of Longer SFN Length for MTC", Samsung, R2-100331, 3GPP TSG RAN WG2 #68bis, Valencia, Spain, Jan. 18-22, pp. 1-2.

3rd Generation Partnership Project, Liaison Statement to External Organizations1 on "Wide-Area Sensor and/or Actuator Network (Wasn) Systems", ITU, RP-110927, Radiocommunication Study Groups, 3GPP TSG RAN Meeting #53, Fukuoka, Japan, Sep. 13-16, 2011, 2 pages.

3rd Generation Partnership Project, "Technical Specification Group Radio Access Network, Evolved Universal Terrestrial Radio Access (E-UTRA), Radio Resource Control (RRC), Protocol specification (Release 10)", TS 36.331 V10.5.0, Mar. 2012, pp. 1-302.

3rd Generation Partnership Project, "Technical Specification Group Radio Access Network, Evolved Universal Terrestrial Radio Access (E-UTRA), User Equipment (UE) procedures in Idle Mode (Release 10)", TS 36.304 V10.5.0, Mar. 2012, pp. 1-33.

3rd Generation Partnership Project, "Technical Specification Group Services and System Aspects, Architecture Enhancements to Facilitate Communications with Packet Data Networks and Applications (Release 11)", TS 23.682 V11.0.0, Mar. 2012, pp. 1-24.

3rd Generation Partnership Project, "Which DRX Cycle is Used After the Configuration of DRX", Huawei, HiSilicon, R2-113140, 3GPP TSG-RAN WG2 Meeting #74, Barcelona, Spain, May 9-13, 2011, pp. 1-2.

Harman, Greg, "LTE Paging Process", Ericsson, Version PA1, NT&C Radio, GSDC Australia, Oct. 30, 2008, pp. 1-43.

* cited by examiner

METHODS AND APPARATUS FOR HANDLING MTC LONG DRX CYCLE/SLEEP LENGTHS

CROSS REFERENCE TO RELATED APPLICATION

This application is a continuation of U.S. patent application Ser. No. 17/246,199, filed Apr. 30, 2021, which is a continuation of U.S. patent application Ser. No. 16/010,759, filed Jun. 18, 2018, which issued as U.S. Pat. No. 11,032,870 on Jun. 8, 2021, which is a continuation of U.S. patent application Ser. No. 13/829,642, filed Mar. 14, 2013, which has been abandoned, which claims the benefit of U.S. Provisional Patent Application No. 61/653,706, filed on May 31, 2012; and U.S. Provisional Patent Application No. 61/644,922, filed May 9, 2012; and the contents of which are hereby incorporated by reference herein.

BACKGROUND

Machine type communication (MTC) devices may not need to frequently connect to a network to deliver or receive data. Additionally, a network may schedule a radio resource for a MTC device on a small number of occasions. Accordingly, MTC devices may not need to monitor a network for a signal or page as often as non-MTC devices. However, current wireless networks do not allow for long discontinuous reception (DRX) cycles or sleep lengths.

SUMMARY

Disclosed herein are methods and apparatus to enable wireless networks to provide a long discontinuous reception (DRX) cycle or sleep length. The embodiments may allow systems and MTC devices, such as a wireless transmit/receive unit (WTRU), to operate with long DRX cycles, sleep cycles, and/or periods. The embodiments may provide and/or enable MTC operations to permit infrequent system access or system reaching. The embodiments may allow MTC devices to sleep for a long period with low power consumption. The embodiments may also allow wireless networks to use an eNodeB (eNB) to perform energy saving algorithms.

A WTRU may be provided that may include a processor configured to perform a number of actions. For example, the processor may be configured to determine a cycle base unit type and a length of a discontinuous reception (DRX) cycle. A number of base units of the cycle base unit type may be generated using the length of the long DRX cycle. The long DRX cycle may be generated from the number of base units.

A WTRU for determining when to receive a signal may be provided. The WTRU may include a processor that may be configured to perform a number of actions. For example, the processor may be configured to determine a system frame number cycle number (SCN) within a total DRX period. A long DRX cycle length may be determined. An offset SCN may be generated using the SCN and the long DRX cycle length.

A WTRU for minimizing clock drift impact may be provided. The WTRU may include a processor that may be configured to perform a number of actions. For example, the processor may be configured to determine a long sleep length, a clock drift rate for a WTRU, and a wake-up time. An adjustment window may be generated using the long sleep length, the clock drift rate, and the wake up time.

A WTRU may be provided that may include a processor configured to perform a number of actions. For example, the processor may be configured to receive a first system frame number (SFN) cycle order number from a network. A second SFN cycle order number may be determined. A drift range may be calculated using the first SFN cycle order number and the second SFN cycle order number.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1A:
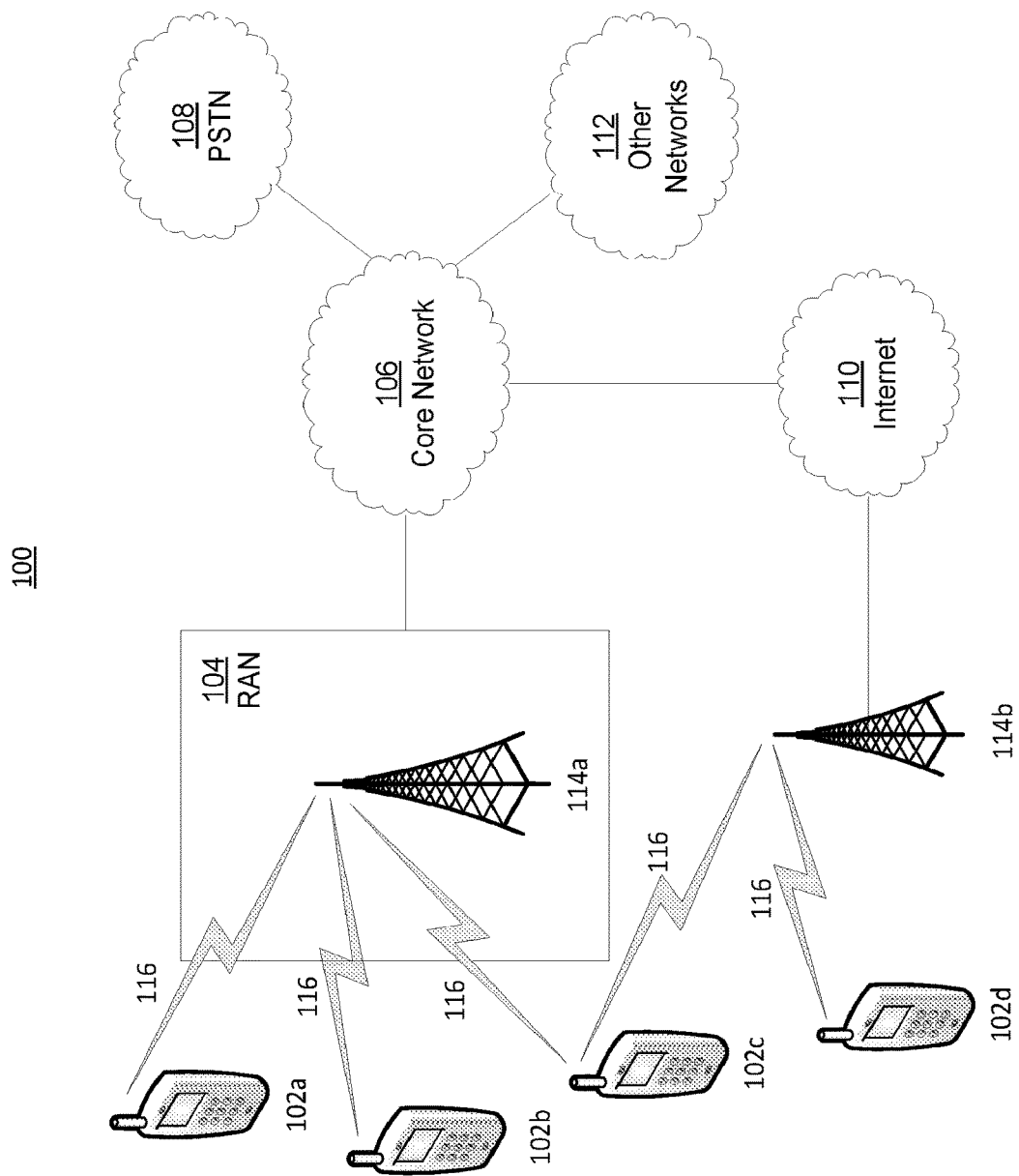
FIG. 1A depicts a system diagram of an example communications system in which one or more disclosed embodiments may be implemented.

A detailed description of illustrative embodiments will now be described with reference to the various Figures. Although this description provides a detailed example of possible implementations, it should be noted that the details are intended to be exemplary and in no way limit the scope of the application.

Some mobile networks may be optimized for human-to-human communications and may be less optimal for machine-to-machine (M2M) communications. Support for machine-type communications (MTC) may be used to accommodate the demand for machine type communications in wireless networks, such as 3GPP LTE wireless networks.

Machine Type Communication (MTC) devices may include wireless transmit/receive units, such as cell phones, metering devices, or the like that may access the network less frequently than devices used for human-to-human use. The MTC devices may be wireless sensors or the like that may be deployed to remote areas for monitoring tasks or other tasks, where there may be limited access to power.

MTC devices may not request to be continually connected for deliver or receive data. For example, a network may allocate radio resources for an MTC device on a reduce number of occasions, which may follow a pattern. MTC devices may not be requested listen to network signaling or network paging for long periods. MTC devices may monitor network signaling or paging less often than non-MTC devices.

A network may have knowledge of the location of a MTC device or may have knowledge of a geographic location where an MTC device may be found. MTC devices may perform less mobility related tasks (e.g. TAU) or cell measurements, or may not perform mobility related tasks during a sleep/dormant period.

MTC devices deployed in a remote area or in an inconvenient area may operate on battery power and may wish to save power. In some cases, MTC battery life may be expected to last for an extended amount of time, such as ten years.

For power saving purposes, a device may shut down for a long period of time, which may be scheduled, and may not listen to a network during this scheduled period of time. In some cases, the MTC device may continue timing and timer maintenance procedures during this period. After this period is over, the device may wake up and may listen to signals, such as MTC downlink paging signals, triggering signals, reaching signals, or the like. This may be done, for example, to determine if the network wishes to communicate with the device.

There may be a number of scenarios where a device may wake up. For example, a device may wake up and may attempt a system access to deliver user data content. As another example, a device may wake up to read system information where the network may try to deliver user data content.

As an example, a device may wake up and may attempt to access a system to delivery data. This may occur, for example, when a power meter wakes up a month at a time to report a power meter reading. As another example, a device may wake up to read system information in case the network may try to deliver data. This may occur, for example, when a device wakes up once a week to determine if the network has an administrative request or task for it, such as an instruction to cut off electric supply for a tenant who may be moving out of an apartment.

A prolonged sleeping period may be referred to as a long DRX cycle or an extended DRX cycle. A long DRX cycle may be a cycle length of a month, a week, a day, or the like. Provisioning of a long or DRX cycle may place a MTC device into an offline shutdown state where the device may not measure the serving cell frequently to ensure coverage for a long period. This may provide opportunities for base stations to perform energy saving tasks, such as planned power downs.

Although devices may simply shut off and power back on as requested, this uncoordinated behavior may lead to having a large amount of devices that may waking up around the same time. This may result in congestion surges. An uncoordinated scheme may rely on a device pulling mechanism where the device may check at regular intervals whether there may be data waiting instead of having the network push data upon arrival based on paging slots.

A DRX-like mechanism may be provided for devices that may sleep longer than the current LTE System Frame Number (SFN) cycle may allow. This may provide a device-network synchronization mechanism that may allow a manageable distribution of devices waking up to access the system. This may also enable the network to deliver user data to devices that may have slept for long periods of time without relying on data pulling mechanisms.

A Long-DRX length unit and/or a Total-DRX-Definition-Period may be a time, a SFN cycle, a combination thereof, or the like, and may be used to allow a device to sleep in days/weeks/months, etc. Scheduling formulas may be provided for configuring WTRUs for long-DRX in a Total-DRX-Definition-Period. Methods may be provided to arrange short DRX within a long-DRX period. An adjustment-window length may be provided and may be a function of the long DRX cycle length and the clock drift rate. Procedures may be provided to schedule an adjustment window for a network and/or a WTRU that may assure that the WTRU may not miss network paging/signaling when the WTRU wakes up with misaligned timing that may be caused by, for example, drift. Network assisted WTRU resynchronization and WTRU autonomous adjustment may be provided. Procedures for coordination of long DRX cycles between a RAN, a WTRU, and Service Capability Server (SCS) may be provided.

To provide device-network synchronization, a DRX mechanism may be used for devices that may use a cycle that may be longer than the current LTE System Frame Number cycle. This may allow a manageable distribution of devices to wake up and access a system. Additionally, this may ensure that the network may deliver data to devices that may have slept for long periods of time without relying on data pulling mechanisms.

In current LTE, a default paging cycle length for a WTRU is, in general, configured to be between 32 to 256 LTE frames (i.e. a device sleeps for about 32 to 256 frames or 0.32 to 2.56 seconds, then wakes up) within a complete SFN cycle (1024 LTE frames).

The current complete LTE SFN cycle is 1024 frames=10.24 seconds or 4096 UMTS frames=40.96 seconds. This time period definition may not be long enough to accommodate longer DRX requirements for MTC devices that may request long sleeping periods, such as days, hours, or the like. Thus, the devices may request longer periods than what is offered by the current LTE or UMTS complete SFN cycle.

If a MTC device, such as a WTRU, were to go into a long sleep for a period long than a SFN cycle, synchronization issues may occur and the local clock may not be adjusted by the network clock. Additionally, the WTRU may not be able to receive network paging messages that were previously scheduled. For example, a WTRU may be in a power saving mode for a long sleep that may last days or weeks. During this period the WTRU may not have contact with the network. A clock used by the WTRU to count timing for a scheduled wake-up may drift. The longer the long-deep-sleep, the more the timing may drift when the device wakes-up. When the WTRU wakes up, the monitoring clock may have drifted. If local clock has drifted beyond a limit, the WTRU may not be able to synchronize and the WTRU may not be able to receive network signaling or paging around the scheduled time.

The current LTE SFN cycle may not evenly distribute delay tolerant MTC device traffic and network access during low system load periods with a long DRX cycle. Additionally, the current LTE SFN cycle may not allow for different DRX or sleep time length units, such as a calendar time unit, that may be used to enable the configuration of MTC DRX or sleep period in order to wake up at the service desired time or moment.

Extended DRX cycles may allow for closer coordination between the RAN and the Service Capability Server (SCS) and/or MTC interworking function (IWF).

Long DRX cycles may be used to limit when other entities may be able to contact the device as the device may be contacted when the device may be available. For example, the SCS may contact the device over the user plane or via a trigger. Since SCS operation may be impacted by the DRX cycle of its registered devices, the SCS may be part of the DRX cycle negotiation or the SCS may be made aware of the DRX cycle of its registered devices.

When the SCS may not be aware of the DRX cycles or of its connected devices, then the SCS may attempt to contact the device over the SGi/Gi user plane or via T v trigger requests while the device may be sleeping. These contact attempts may cause unwanted signaling between the core network (CN) and the SCS. Mechanisms may be provided to allow the RAN to inform the SCS of the MTC device's DRX cycle.

The core network may reject any communication attempt towards a device that may be is in a long DRX cycle. Additional measures may be taken to ensure that the SCS and its associated network applications may not attempt to continuously reach sleeping devices.

The core network may not know how long devices may be allowed to sleep without breaking application level functionality. The SCS may know this information or may be able to learn it when the MTC device registers with the SCS. Mechanisms may be provided to allow the SCS to inform the RAN of the DRX requests of an MTC device, such as how long the device may sleep without breaking the application requirements.

There may be some cases where the device may simply inform the RAN of its DRX requests. However, it may be more efficient if the SCS coordinated when it may poll the meters, how often they may be polled, and when they may be available for SW upgrades.

Embodiments described herein may provide units and mechanisms for long-drx time scenarios that may allow and support the LTE time unit for time periods longer than a complete SFN cycle.

Procedures and messages may be provided to allow the SCS to coordinate the allowable DRX cycle lengths with the RAN.

Embodiments disclosed herein may provide methods to mitigate synchronization issues that may occur when the local WTRU clock drifts beyond a recovering period. These methods may include mechanisms that may allow the reception of paging messages within a time window, which may be affected by factors such as the long sleep time, WTRU speed, WTRU capabilities, or the like. For example, given a clock drift rate, the length of the adjustment-window may be a function of the long-deep-sleep length such that the longer the long-deep-sleep length, the greater the adjustment-widow length/size. Embodiments may allow for a relationship between an adjustment-window and a long-deep-sleep-length. The embodiments may also provide actions that may be taken by a WTRU, a network (such as eNB and MME), or both the WTRU and network before or during the adjustment-window period.

As used herein, the term extended DRX cycle, the term long DRX cycle, and the term long sleep cycle/period may be used interchangeably. The term adjustment-window and the term receive-window may also be used interchangeably.

Although the embodiments may be described in terms of an LTE network, the embodiments may also apply to other radio access technologies, networks, devices, and periodic operations, such as network broadcast/multicast and WTRU receptions.

The long DRX cycle and its operation configuration may be configured for WTRUs that may request a long sleep. As used herein, a serving node and may refer to mobile switching center (MSC), a serving general packet radio service (GPRS) support node (SGSN), or mobility manager gateway (MME).

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be requested to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
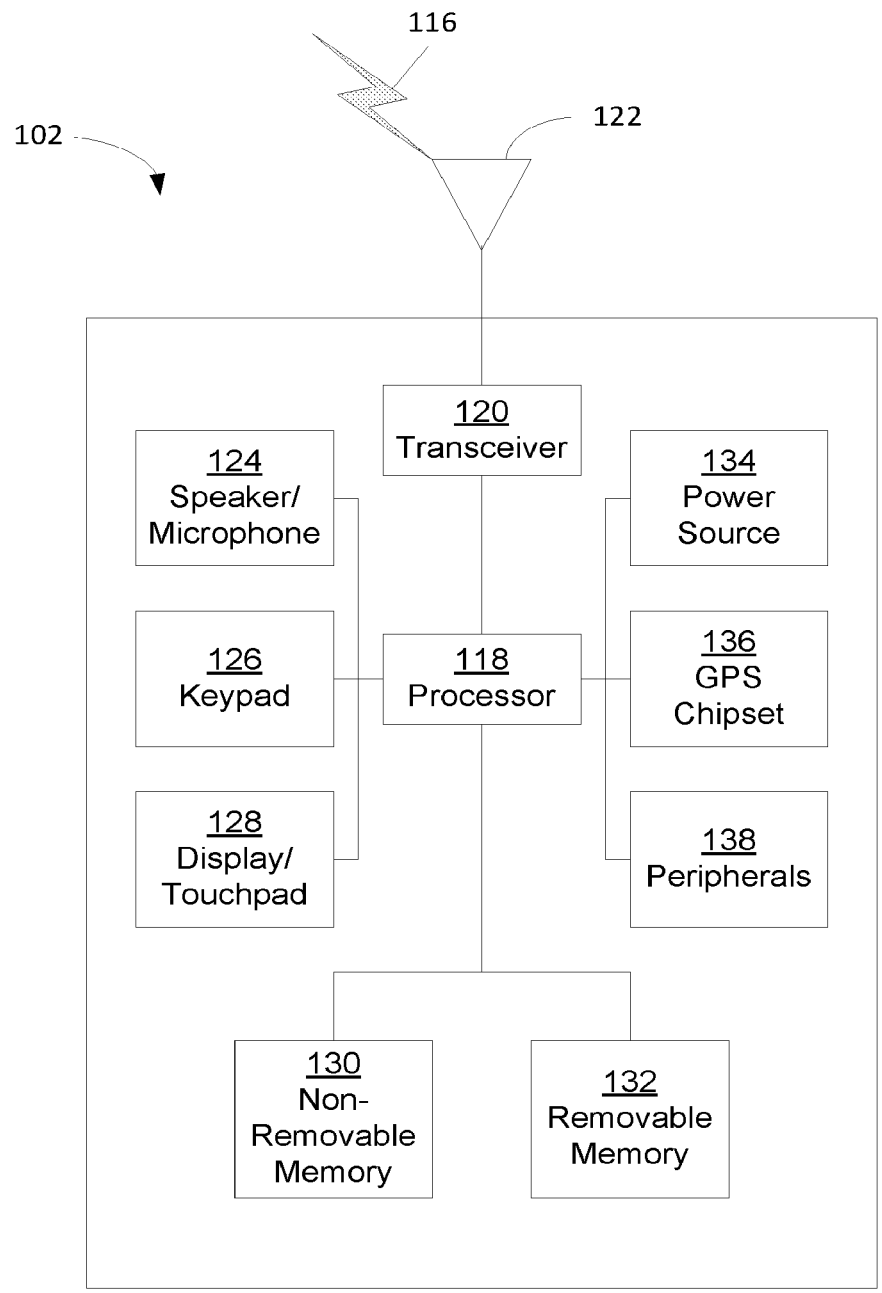
FIG. 1B depicts a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
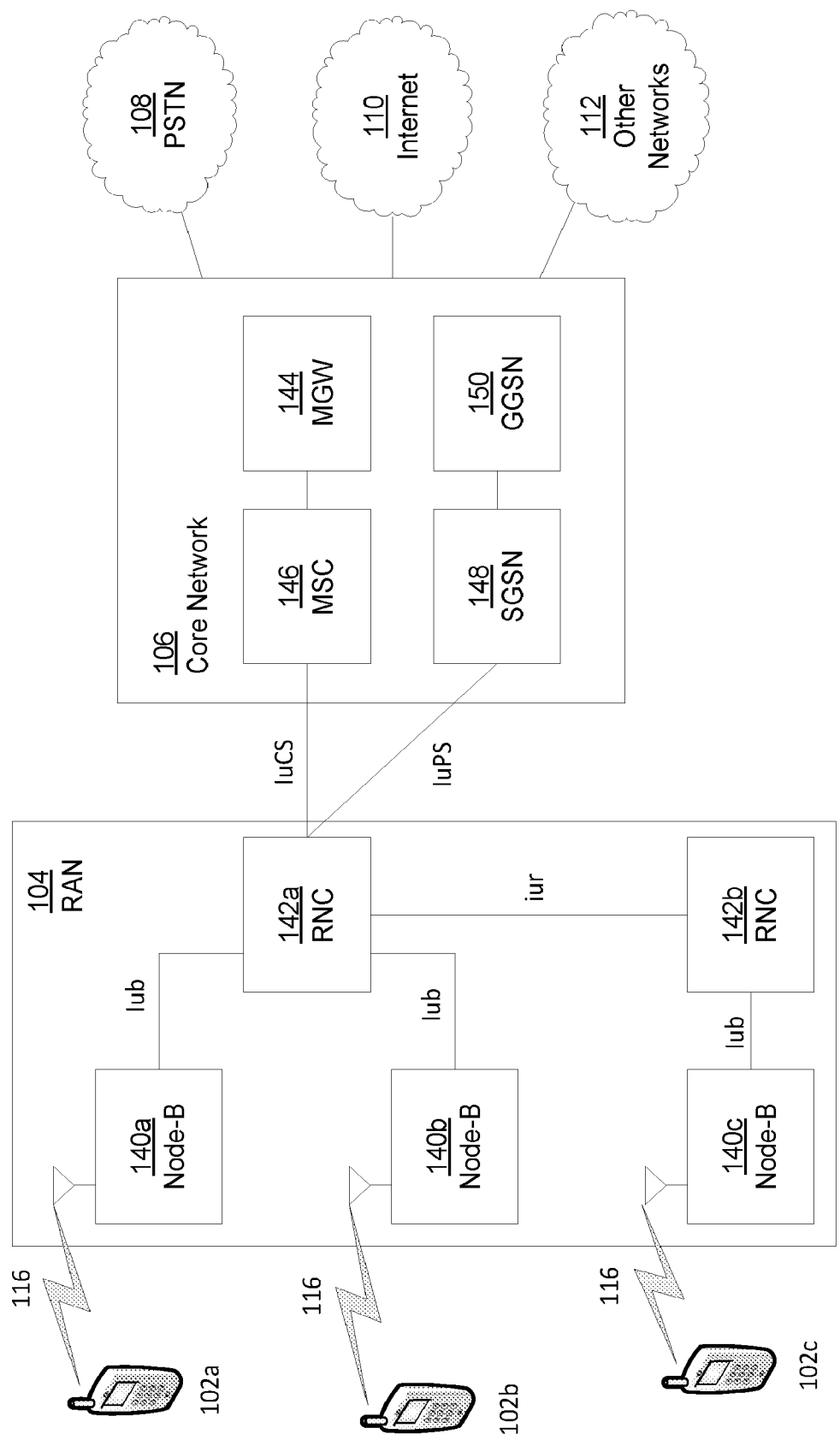
FIG. 1C depicts a system diagram of an example radio access network and an example core network (CN) that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
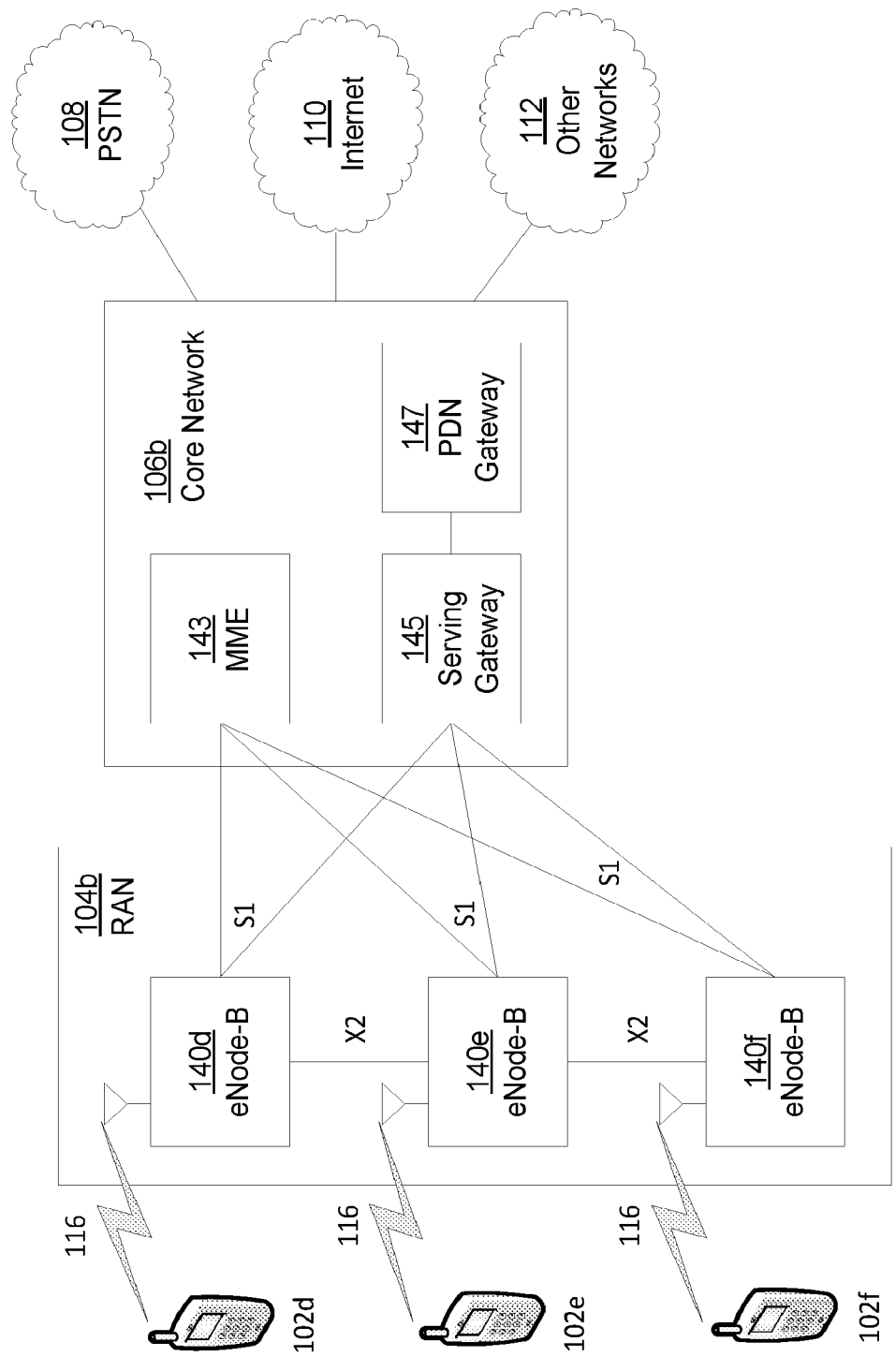
FIG. 1D depicts a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
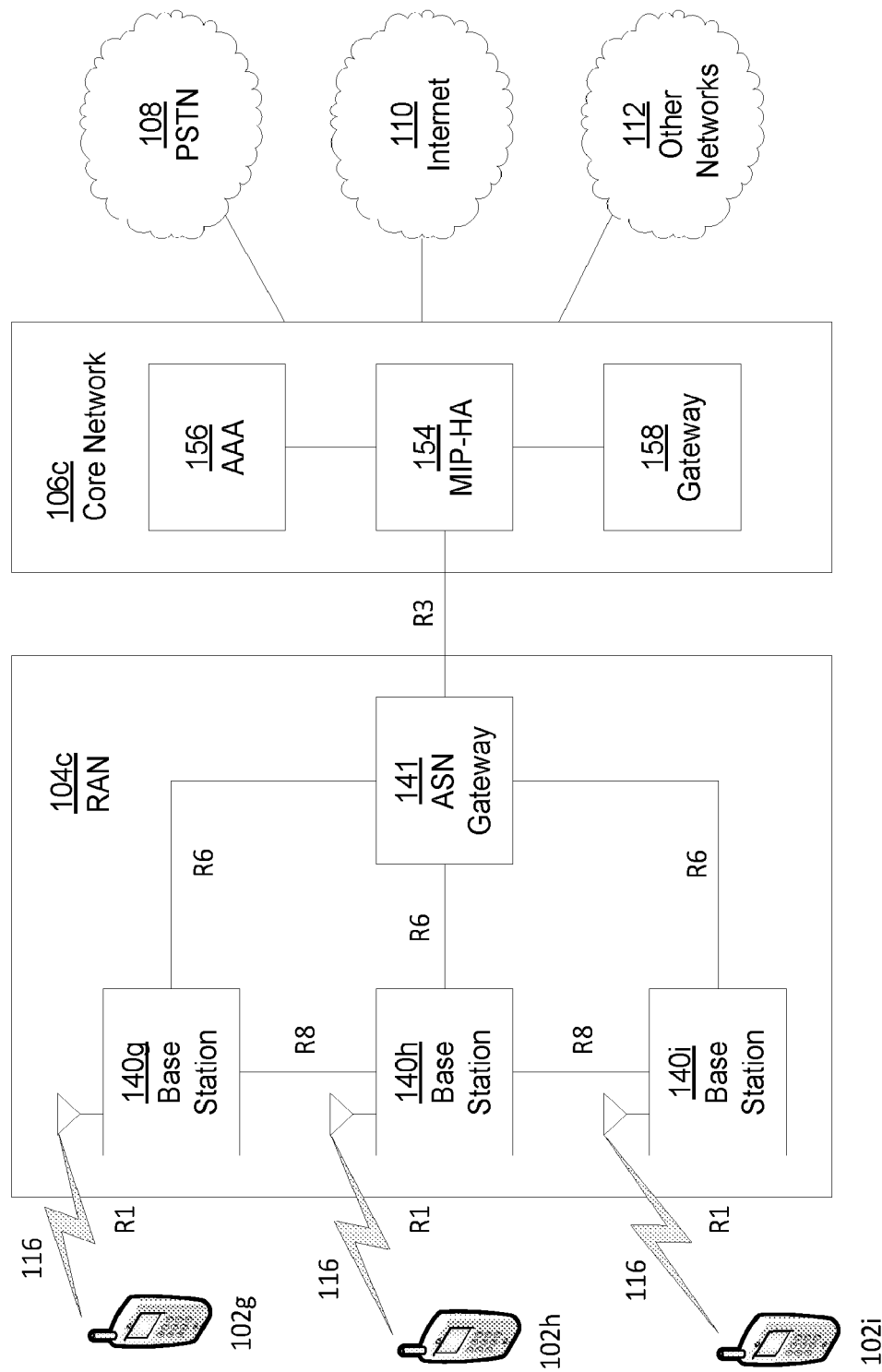
FIG. 1E depicts a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Embodiments may provide Long DRX cycle length definition and configuration of the long DRX cycle for MTC devices. Some MTC devices require low power consumption. Thus, frequent monitoring, paging, and/or listening to system information may unnecessarily waste the battery power of these MTC devices. Extended DRX cycle or the long DRX cycle length units may be used for these types of MTC devices to enable these devices to sleep/DRX under scheduling or configuration.

A long DRX cycle may be provided. To accommodate the long DRX cycle operation, one or more cycle length base units may be described herein. A long DRX cycle may be one or more of the base units.

To align with the current 3GPP wireless DRX cycle base unit, a long DRX cycle length unit may be based on an SFN cycle. For example, one or more of the SFN cycle(s) may be used as the base unit. This may be referred to as an extended SFN cycle(s). A long DRX cycle length, which may be the extended SFN cycle, may be of n SFN cycle(s), where the n value may be:

[1, 2, 4, 8, . . . ] or [1, 3, 6, 12, . . . ] or [$k^m$b, where k=2, 3, 4, . . . and m=0, 1, 2, . . . and b=1, 2, 3, 4, . . . ], etc.

The n value or the values used for deriving n, such as k, m, and b, may be predefined or network configured. The long DRX cycle, the extended DRX cycle, or the long-deep-sleep period may consist of one or more of the extended SFN cycles described herein.

To align with possible MTC operation service time definitions, a long DRX cycle, an extended DRX cycle, or a long deep sleep period unit may be based on time units or calendar time units, such as a second, a minute, an hour, a day, a week, a month, a combination of those units, or the like. For example, a long DRX cycle may be two-days, two-weeks, or one-month-plus-two-days, etc. Depending on the service the MTC device may be configured for, the network may assign the MTC devices with service specific extended DRX cycle length. A system may use broadcast or MTC specific messages to convey the MTC extended DRX cycle and parameters to MTC devices. When using a time unit for sleep/DRX in a configuration and if the configured time does not start or end on an SFN cycle boundary, then the counting of the start and the end of such a time unit may be rounded forward to the next SFN cycle boundary.

To align with the MTC service time and to facilitate DRX operation with frame-based 3GPP DRX operations, a combination of the two units described above may be used, i.e. the time unit(s)+the extended SFN cycles. For example, a long DRX cycle length unit (definition-C) may be 2-week+ 5*extended SFN cycles or may be one-week+7*SFN cycles. This may be used to provide a long DRX cycle that may have a length of in days and a low activity period of the day. A mechanism may be provided to distribute the MTC device evenly among the low activity period in the extended/long DRX cycle.

To ensure that an MTC server may have a chances to trigger a MTC device, the system may configure the MTC device to stay in a normal DRX cycle for some time after one or more long DRX cycles. For example, the long DRX cycle may be a three-tuple, such as:

extended DRX cycle=number of Day+low Activity Period+OnTimePeriod where the "number of Days" may be the days of the extended DRX cycle, the "low Activity Period" may be the period of low activity during the day (e.g. 4 am), and the "OnTimePeriod" may be the length of time the WTRU may monitor the paging over a shorter or regular DRX.

A Total-DRX-Definition-Period may be provided. The Total-DRX-Definition-Period may be a multiple of a long DRX cycle. The Total-DRX-Definition-Period may be a combination of some multiples of the DRX base units described herein. For example, a Total-DRX-Definition-Period may be based on an extended SFN cycle, a time unit, a calendar time unit, or combination of an extended SFN cycle and a time unit, or any combination thereof, or the like.

A Total-DRX-Definition period may be as a combination of one or more of the descriptions provided in the following paragraphs.

A Total-DRX-Definition-Period may be a multiple of an extended SFN cycle base unit as described herein. For example, the Total-DRX-Definition-Period may be a multiple of an extended SFN cycle, such as 32 extended SFN cycles. A Total-DRX-Definition-Period may be a combination of an extended SFN cycle and a base unit, such as 36 extended SFN cycle plus 12-SFN cycles. If the Total-DRX-Definition-Period may be m extended SFN cycles, each with (n) SFN cycles, the Total-DRX-Definition-Period may have (m*n) SFN cycles. This may be numbered as [0, 1, . . . m×n−1]. If the Total-DRX-Definition-Period may be a combination of multiples of some of the base units described herein, then the Total-DRX-Definition-Period may have a combination of (j) extended SFN cycles and (k) SFN cycles and it may have (j*n)+k SFN cycles. This may be numbered as [0, 1, . . . , j*n, j*n+1, j*n+2, . . . j*n+k−1]. The MTC device, such as a WTRU, and the network supporting the long-DRX operation may count the SFN Cycle Number (SCN) from 0 to the end of the Total-DRX-Definition-Period (i.e. the m*n−1 or the j*n+k−1 SFN cycles) and may wrap-around to the next period from the 0 SFN cycle again.

A Total-DRX-Definition-Period may be a base unit, such as 6-months, or a combination of multiples time units, such as 9-months plus 12-weeks. In some scenarios, the conversion of the Total-DRX-Definition-Period to the number of extended DRX cycle or the number of SFN cycles may be rounded up to the nearest Extended DRX cycle or to the nearest SFN cycle.

A Total-DRX-Definition-Period may be some combination of the base units described herein, such as a combination of an extended SFN cycle and a time unit. For example, the Total-DRX-Definition-period may be 24 weeks plus 42 extended SFN cycles. In some scenarios, the conversion of the Total-DRX-Definition-Period to the number of extended DRX cycle or the number of SFN cycles may be rounded up to the nearest extended DRX cycle or to the nearest SFN cycle.

A Total-DRX-Definition-Period may also be a combination of any of the embodiments described herein. MTC device configurations may be provided for utilizing the long DRX cycle. As described herein, the Total-DRX-Definition-Period and the Long-DRX-base-units (which may include the extended SFN cycle, a base unit, or combinations thereof) may provide MTC devices for long dormant periods of sleep that may preserve power. The Total-DRX-Definition-Period and/or the long DRX base unit may be configured for a MTC device to allow the device to operate in a discontinuous reception mode, idle mode, an offline mode, or the like. This may allow the MTC device, such as a WTRU, to identify its paging time after the long sleep or long DRX.

A formula may be used for scheduling a page/signal/reach for a MTC device that may have been in a long sleep. For example, one or more SFN cycle(s) may be identified in a Total-DRX-Definition-period such that the network may page the device in that cycle and the device may perform monitoring and reception. The SFN cycle may also be identified such that the MTC device may find its paging frame(s) and the paging subframe occasion(s) either with the an idle mode paging reception formula or with some other formula or rules.

Figure 2:
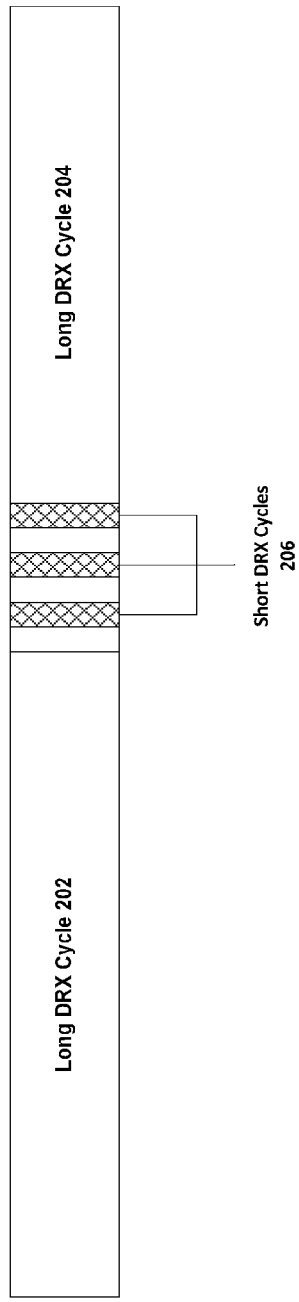
FIG. 2 depicts an example of a short discontinuous reception cycle (DRX) cycle scheduled within a long DRX cycle.

For example, a WTRU may obtain the monitoring/reception $N^{th}$ SFN cycle while configured for long DRX or long deep sleep using the following:

SCN % ConfiguredLongDRXCycleLength=OffsetSCN, where the SCN may be the counting of the SFN cycle number, described herein, within the Total-DRX-Definition-Period;

the ConfiguredLongDRXCycleLength may be the extended DRX cycle or the long DRX cycle length configured to the WTRU in numbers of SFN cycles; and the OffsetSCN may be an offset in unit of SCN given by the network As shown in FIG. 2, a shorter DRX cycle may be scheduled inside a long DRX cycle. Temporary network congestion or RAN resource jamming may cause a MTC device, such as a WTRU, to miss a network paging or signal after a long-sleep. For the network and/or the MTC device to avoid missing a network paging or signaling after a long-sleep, a short DRX cycle within a long DRX cycle may be configured. The short DRX cycle may be configured in a second long DRX cycle that may occur after a first long DRX cycle. For example, as shown in FIG. 2, long DRX cycle 202 may be configured such that it may not include one or more short cycles. Long DRX cycle 204 may occur after long DRX cycle 202. One or more short DRX cycles may be configured within long DRX cycle 204, such as short DRX cycles 206. A short DRX cycle, such as short DRX cycles 206, may be used, for example, to provide occasions for a network to re-transmit and/or for a WTRU to re-receive a signal. Network paging/signaling repetitions may run with the one or more short DRX cycles from short DRX cycles 206. Network paging/signaling may be scheduled from the long DRX cycle boundary.

A network may configure a WTRU with a long DRX cycle, which may be followed a number, M, DRX cycles. After a MTC device, such as a WTRU, wakes up from a long DRX, it may use a short DRX cycle for a period of time.

Configured LongDRXCycleLength may be a multiple (m) of the ShortDRXLength in the following formula such that the short DRX occasions may be on the SCNs with ((SCN−OffsetSCN) % ConfiguredLongDRXCycleLength)= (n*ShortDRXLength), where n=(1, 2, . . . m−1) configurable.

Short DRX cycles may be placed before, around, or after a long DRX cycle boundary; before, around, or after a scheduled paging SFN cycle; or before, around, or after the network paging/signaling frames. These schedules may be configured by the WTRU or the network. Network paging/signaling may be scheduled at those boundary, cycle, or frames.

Figure 3:
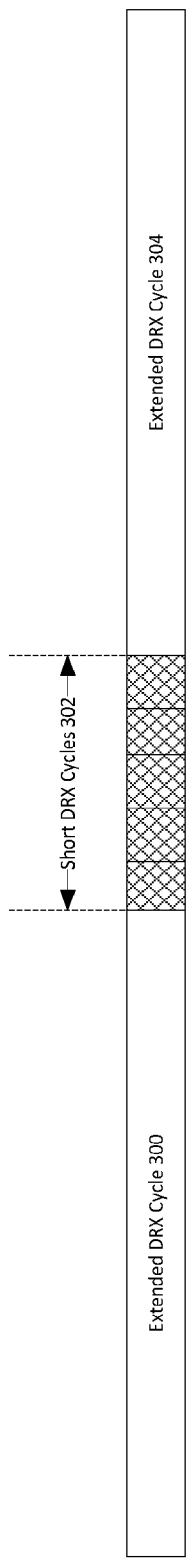
FIG. 3 depicts an example of a short cycle being used in between long DRX cycles.

As shown in FIG. 3, short cycles may be used in between long DRX cycles. A network may configure a WTRU with an extended/long DRX cycle followed with m number of DRX cycles. In this configuration, after a MTC device wakes up from the extended DRX, it may take shorter DRX cycles for a period of time and then may start another long or extended DRX cycle. For example, as shown in FIG. 3, extended DRX cycle 300 may be scheduled. Short DRX cycles 302 may be scheduled after extended DRX cycle 300. Extended DRX cycle 304 may be scheduled after short DRX cycles 302.

The MTC device may be configured with an extended DRX cycle that may follow the extended DRX cycle in idle mode. If the extended DRX cycle may be configure through a WTRU dedicated message, a network may configure a MTC device with an extended DRX cycle using a RRC message, or a NAS message. For example, a WTRU may trigger a tracking area update (TAU) procedure and may send a TAU message to the network. In the message, the WTRU may indicate its ongoing MTC applications. Based on the ongoing WTRU applications, or the changes in the ongoing WTRU applications, the network may configure the MTC device with an extended DRX cycle or may modify the configured extended DRX cycle.

When MTC device is configure with extended DRX cycle, MTC device may calculate its wake up time. For example, the MTC may use the following formula:

StartTime=(number of Day) % (LongDRXCycle-Unit)+low Activity Start Time+(low Activity length) % (LongDRXCycleUnit)

where LongDRXCycleUnit may be a number that given by the system or calculated from UeID.

An uneven sleep period assignment may be provided. For MTC devices, the uneven sleep period or periods may be assigned by the network to the WTRU such that the WTRU may sleep for a different period from time to time according to the assigned long sleep length. For example, a WTRU may sleep for 5 hours, wake up, and then may sleep for 5 months. The uneven sleep period may be assigned by a message or may be assigned by rules. The uneven sleep period(s) may be assigned one a time or several uneven periods may be assigned at once.

assume that the device may be using existing DRX methods. When the MTC device application registers with the SCS, the SCS may indicate the application requested sleep parameters to the core network and RAN (eNB or RNC). The RAN (eNB or RNC) may then calculate the long DRX cycle parameters that may be used by the device.

Figure 4:
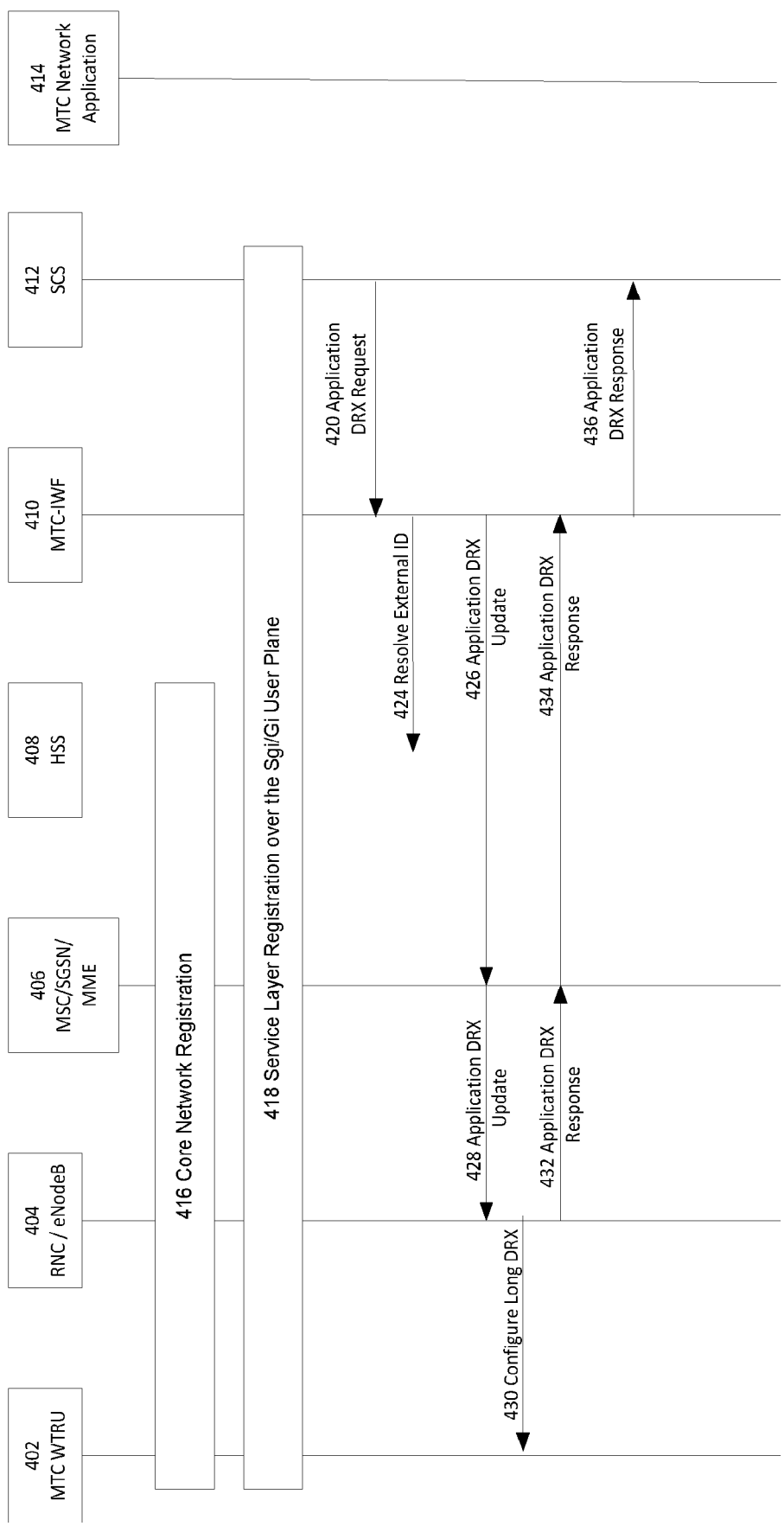
FIG. 4 depicts an example method for DRX configuration that may be initiated by a service capability server (SCS).

For example, as shown in FIG. 4, at 416, MTC WTRU 402 may register with a core network, which may include RNC/eNodeB 404, MSC/SGSN/MME 406, and HSS 408. Subscription information for MTC WTRU 402 in HSS 408 may include an indication that MTC WTRU 402 may support Long DRX. A long DRX cycles may not have been configured. At 418, one or more MTC Applications on MTC WTRU 402 may register with the service layer using application/service layer procedures, which may involve RNC/eNodeB 404, MSC/SGSN/MME 406, HSS 408, MTC-IWF 410, and SCS 412. At 420, SCS 412 may register the application(s) DRX parameters with the core network. This information may be passed to MTC-IWF 410 via, for example, a Tsp reference point. This may occur, for example, using a message on the Tsp reference point. This message may be provided as shown in Table 1:

TABLE 1

Application DRX Request Message

| Information Element | M/O | Description |
|---|---|---|
| Device External Identifier | M | The device external ID (e.g. MSISDN, FQDN, etc.) Note: This field may be populated with a group identifier so that the SCS may request DRX parameters for a group of devices. |
| SCS Identifier | M | The SCS ID (e.g. MSISDN, FQDN, etc.) |
| Application Identifier | O | The application ID (e.g. Port Number, SCS assigned name, etc.) Note: This field may be populated with a group identifier so that the SCS may request DRX parameters for a group of applications. |
| Max Off Time | O | The maximum amount of time that the application may be allowed to sleep. The units of this field may be seconds or some period of time. |
| Min On Time | O | The minimum amount of time that the device may stay on when coming out of sleep. The units of this field may be seconds or some period of time. |
| Mandatory On Times | O | Periods of the day when the device may be reachable. The units of this field may be seconds or some period of time. |
| Permitted Off Times | O | Periods of the day when the device may not be reachable. The units of this field may be seconds or some period of time. |

DRX cycle configuration may be provided. DRX configurations determination may be provided by an operator. Information may be obtained from the SCS before calculating the DRX cycle. A MTC-IWF and a SCS may be informed of the DRX configuration.

A SCS may initiate a DRX cycle configuration. FIG. 4 depicts a method for DRX configuration that may be initiated by a SCS. The allowable length of a long DRX cycle may depend on an application and may be dynamic. When an MTC device first connects to a network, the network may Referring again to FIG. 4, at 424, MTC-IWF 410 may use an S6m reference point to resolve the device and SCS identifiers to subscription identifiers. The MTC-IWF may also identify the serving node of the device. This may include a check of the HSS subscription parameters to verify that MTC WTRU 402 supports long DRX cycles. At 426, MTC-IWF 410 may pass updated DRX information to the serving node using, for example, a T5 reference point. This may be done, for example, using a message, such as the message shown below in Table 2:

TABLE 2

Application DRX Update Message

| Information Element | M/O | Description |
|---|---|---|
| Device Internal Identifier | M | The device internal ID (e.g. IMSI) Note: This field may be populated with a group identifier so that the SCS may request DRX parameters for a group of devices. |
| MTC-IWF Identifier | M | IP Address, SS7 address, ISDN, etc. |
| Application Identifier | O | The application ID (e.g. Port Number, SCS assigned name, etc.) The serving node or RAN may use this ID to keep track of the |

TABLE 2-continued

Application DRX Update Message

| Information Element | M/O | Description |
|---|---|---|
| | | multiple applications that may be on a device and how their DRX parameter requests may overlap.<br>Note: This field may be populated with a group identifier so that the SCS may request DRX parameters for a group of devices. |
| Max Off Time | O | The maximum amount of time that the application may be allowed to sleep. The units of this field may be seconds or some period of time. |
| Min On Time | O | The minimum amount of time that the device may stay on when coming out of sleep. The units of this field be seconds or some period of time. |
| Mandatory On Times | O | Periods of the day when the device may be reachable. The units of this field may be seconds or some period of time. |
| Permitted Off Times | O | Periods of the day when the device may not be reachable. The units of this field be seconds or some period of time. |

At 428, the serving CN node may use an Iu or S1-MME reference point to pass the updated DRX information to the RAN. This may be done using, for example, a NAS message that may be sent to the RAN, which may include the information shown in Table 2 (the MTC-IWF address may not be requested). At 430, DRX parameters may be calculated and the device may be configured with the DRX parameters. The CN serving node may inform/configure the MTC device directly with a NAS message, such as described above, on the long DRX or long sleep activity.

At 432, the RAN may pass the DRX parameters to the serving node via the Iu or S1-MME reference points. This message may include the information that may be shown in Table 2. The MTC-IWF address may not be included. The RAN may configure the device with parameters that may be different than what was requested. Different parameters may be selected due to network congestion or the RAN may select different parameters in order to accommodate other applications on the same device may have different DRX parameter requests (i.e. another application may request to be on at different times).

At 434, the serving note may pass DRX parameters received at 432 to MTC-IWF 410. This may be done, for example, using a T5 reference point. MTC-IWF 410 may store updated DRX parameters so that it may manage trigger requests. At 436, MTC-IWF 410, may send the DRX parameters to SCS 412 using, for example, a Tsp reference point. The DRX parameters may be different than what may have been requested at 420.

Figure 5:
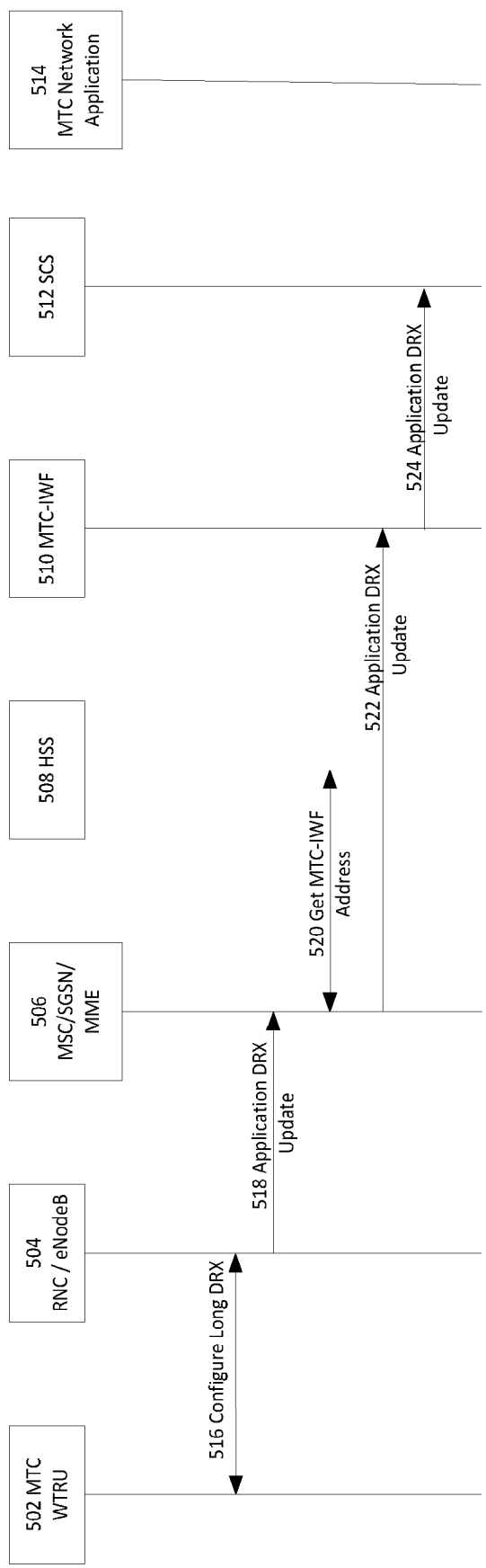
FIG. 5 depicts an example method for a DRX cycle configuration that may be initiated by a radio access network (RAN).

DRX cycle configuration may be initiated by a WTRU or a RAN. FIG. 5 depicts a method for DRX cycle configuration that may be initiated by a RAN. When network conditions change, when an MTC devices moves, or when an MTC application wakes up, the WTRU or RAN may reconfigure a DRX cycle for the WTRU. When the WTRU and RAN (eNB and RNC) change the DRX parameters for the WTRU, the SCS may be informed.

As shown in FIG. 5, at 516, MTC WTRU 504 and a RAN, such as RNC/eNodeB 504, may negotiate a DRX cycle. This may be initiated by the WTRU or the RAN (eNB or RNC). The information exchanged may be the same as what is shown in Table 1. An MTC-IWF address may or may not be used.

At 518, the RAN (eNB/RNC 504) may inform the serving node, MSC/SGSN/MME 506, of the DRX cycle parameters. The serving node may be a MSC, SGSN, or a MME. This may be done, for example, by sending a message using the Iu and S1-MME reference points. The fields of the message may be the same as what is shown in Table 2. An MTC-IWF address may or may not be included.

At 520, MSC/SGSN/MME 506 may send a get MTC-IWF address message to HSS 508. This may be done, for example, to allow the serving node to query HSS 508 with the international mobile subscriber identify (IMSI) for a device for the MTC-IWF, such as MTW-IWF 510, that may be used to reach the SCS, such as SCS 512, that the device may be registered to. The message may be sent on an S6m reference point.

At 522, MSC/SGSN/MME 506 may inform MTC-IWF 510 of the DRX cycle parameters. This may be done, for example, sending a message using the T5 reference point. The fields of this message may be the same as what may be shown in Table 2.

At 524, MTC-IWF 510 may inform SCS 512 of the DRX cycle parameters. This may be done, for example, by sending a message using on the Tsp reference point. The fields of this message may be the same as what may be shown in Table 1.

Figure 6:
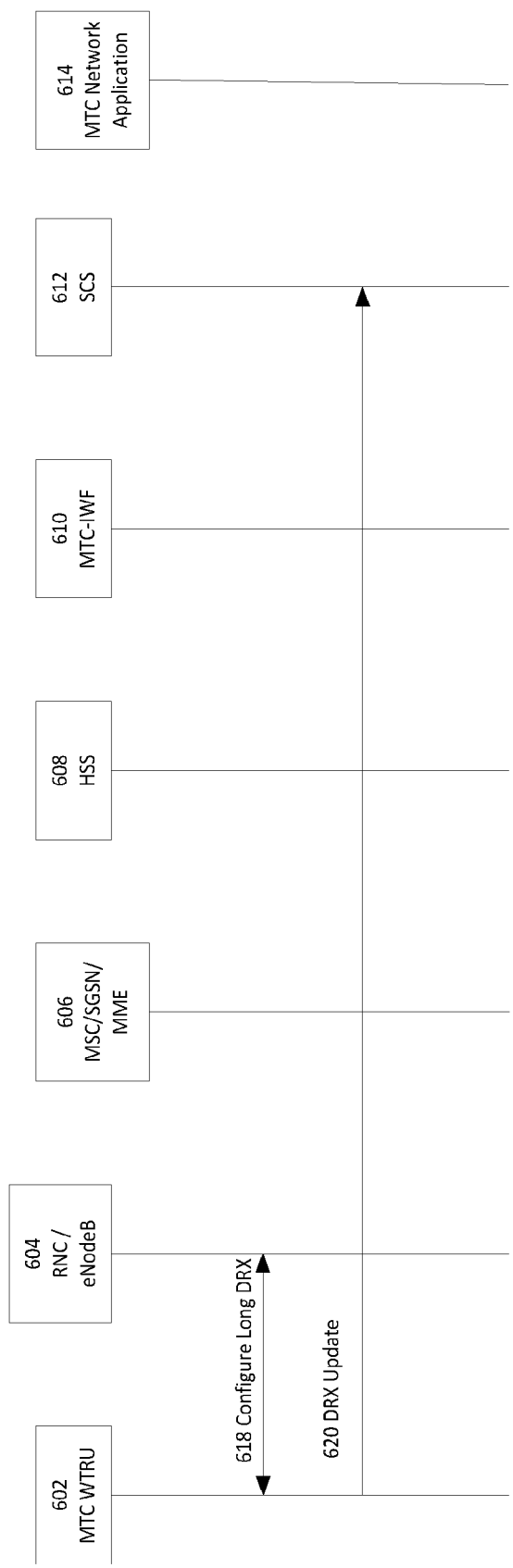
FIG. 6 depicts another example method for a DRX cycle configuration that may be initiated by a RAN.

DRX cycle configuration may be initiated by a WTRU or a RAN. For example, the SCS may be informed of a DRX cycle for a device. FIG. 6 depicts another method for DRX cycle configuration that may be initiated by RAN.

As shown in FIG. 6 at 618, MTC WTRU 602 and a RAN, such as RNC/eNodeB 604, may negotiate a DRX cycle. This may be initiated by the WTRU or RAN (eNB or RNC). The information exchanged may be similar to what may be shown in Table 1. The MTC-IWF address may or may not be used.

At 620, the service layer of MTC WTRU 602 may inform SCS 612 of a DRX update over a user plane connection. This communication may happen between service layers (i.e. European Telecommunications Standards Institute (ETSI)). This message may include the fields that may be shown in Table 1. The MTC-IWF address may or may not be used. MSC/SGSN/MME 606 and MTC-IWF 610 may not be informed of the of the DRX cycle. SCS 612 may be trusted not to continuously attempt to contact the device when it may be sleeping.

Device trigger requests may be provided. For example, device triggering procedures may occur over a Tsp reference point. The procedures on this interface may be updated to account for the where a SCS may attempt to trigger a device that may be in a long DRX cycle. The MTC-IWF may choose to reject or buffer the trigger request. For example, the device may not be scheduled to be awake for several hours and MTC-IWF policies may determine how long the MTC-IWF may buffer triggers.

If the MTC-IWF chooses to reject the trigger request, the MTC-IWF may send the SCS a Device Trigger Confirm message with a value that may indicate that the request may be rejected because the device may be in a long DRX cycle. The Device Trigger Confirm message may indicate a time when the trigger may be attempted again.

If the MTC-IWF chooses to cache the trigger request until the device may be reachable, the MTC-IWF may send the SCS a Device Trigger Confirm message with a value that may indicate that the request may be buffered because the device may be in a long DRX cycle. The Device Trigger Confirm message may indicate an estimate as to when the trigger may be delivered. The SCS may know the DRX cycle of the MTC applications that may be registered to it. The SCS may avoid making triggering requests to an application that may not be reachable.

DRX classes may be provided. To reduce the amount of signaling inside of the CN, between the CN and SCS, or between the WTRU and RAN, a set of DRX classes may be defined. The Max On and Max Off times of Table 1 may then be determined by a predefined class number. An example may be shown in Table 3. The predefined classes may be used to determine the duty cycle of the DRX cycle, and may not be used to determine when the duty cycle starts.

TABLE 3

DRX Class Example

| Class Number | MIN ON TIME | MAX OFF TIME | Example Use-Case |
|---|---|---|---|
| 0 | 30 Seconds | 1 Hour | Environmental Sensor, Asset Tracking |
| 1 | 1 Minute | 23 Hour | Smart Meter, Patient Surveillance |
| 2 | 10 Minutes | 1 Week | Retail Monitoring, Product management, Vehicle diagnostics |
| 3 | 15 Minutes | 1 Month | Disaster Detection (sensor may initiate contact at any time - SCS may initiate contact one a month) |

An adjustment-window may be defined from the length of the scheduled long-sleep period. The WTRU and/or network may perform procedures for the adjustment. A receiving window or an adjustment-window may be defined at the WTRU side and may be used interchangeably. With the receiving window, a WTRU may monitor the paging channel as it may do in an IDLE state. The receiving window may start as a WTRU may wake up from the long sleep and the window may end when the WTRU may have received the paging or may end after a period of time (such as a receiving window length). The receiving window length may be predefined, indicated by the network, or calculated from the long sleep period. When the receiving window starts, WTRU may perform synchronizing with the network, reading MIB and SIBs. The WTRU may start monitoring the paging channel with a DRX cycle, which may be a paging cycle. The paging occasions may be related to SFN. Since the WTRU and the network may be synchronized with SFN, the WTRU may not miss the paging. The receiving window length for the WTRU may be long enough to cover the drifted time and the receiving window for the WTRU may start earlier than the network starts the transmitting window.

An adjustment window may be defined from the length of the scheduled long sleep period. When a MTC WTRU goes dormant, it may not perform any activities that may involve contact with the network to save power. For example, the MTC WTRU may not perform measurement of the cell or perform any mobility area update. The WTRU may not have a chance to learn the network timing and adjust its own clock and the WTRU clock may drift from the network clock. This may occur at a certain rate and may depend on the make of the clock. The longer the MTC WTRU may sleep, the more it may drift from the network timing on which the activity of communication synchronization may be based.

When the long sleep MTC WTRU wakes up for a scheduled activity with the network, it may fail because of missed timing or synchronization. This may occur, for example, with schedule activities such as monitoring or receiving network paging or work signals. This may also occur when accessing the network.

An adjustment window period may be provided to avoid missed timing or synchronization due to clocking drifting during a long sleep period. During the adjustment window period, the MTC WTRU and/or the network may take action to resynchronize or to remediate the negative impact of the missed timing.

The adjustment window may be defined as a function of the long sleep period and the clock drift rate, known or estimated:

$$\text{Adjustment window length} = \text{Long-Sleep-Length} * \text{ClockDriftRate} + \text{RoundUpTime}$$

where the RoundUpTime maybe predefined, configured or a value related to the Long-Sleep-Length or the ClockDriftRate The adjustment window may also be defined using the following formula:

$$\text{Adjustment window length} = (\text{Long-Sleep-Length} * \text{ClockDriftRate}) * N$$

where the N could be [1, 1.2, 1.4, 1.6, . . . , 2].

The adjustment window length unit may be a unit such as the LTE SFN cycle, an LTE frame, or the like. The length of the receiving window (i.e. the adjustment window) length may also be a value of time (e.g. 512 ms), a number of default paging cycles (e.g. 2×Paging Cycles), a number of radio frames (e.g. 20×Radio Frames), or the like.

The receiving window length or the ClockDriftRate may be broadcasted in the system information.

A network may start paging before the calculated receive window starts in a WTRU and may use a longer window length to cover the drifted time to make the paging more reliable.

A WTRU may determine a window length to be used for the WTRU. The WTRU may notify the network of its receiving window length or the clock drift rate in the initial Attach or TAU message. In this case, the network paging message may also carry the receiving window length or clock drift rate information.

Figure 7:
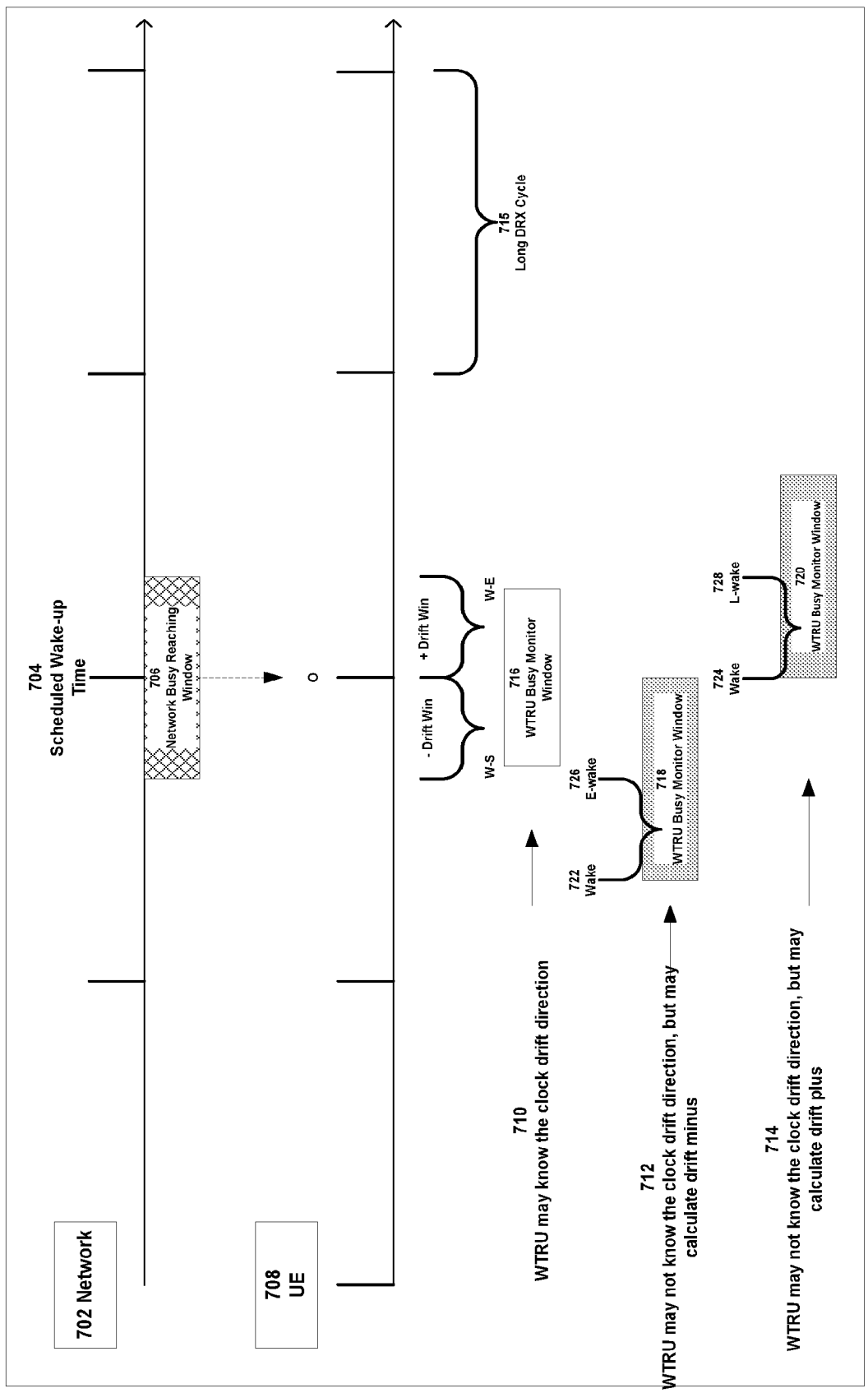
FIG. 7 depicts example network and WTRU procedures for busy reaching and monitoring.

WTRU and network procedures may be performed during the adjustment window. FIG. 7 depicts network and WTRU procedures for busy reaching and/or monitoring. The network, such as network 702, and a long sleep WRTU, such as WTRU 708, may avoid an issued caused by clock drift when the WTRU has computed the adjustment window length (i.e. the drift estimates). At 706, network 702 may employ a Busy Reaching Window around scheduled wake up time 704, which may be a boundary of a Long DRX cycle such as Long-DRX cycle 715. During Busy Reaching Window 706, the network may send paging or other reaching signal to a WTRU that may be waking up from a long sleep. The length of Busy Reaching Window 706 may be based on the estimated longest adjustment window length. For example, three quarters, one, one and one half or twice the length of an estimated longest adjustment window length may be used for the length of Busy Reaching Window 706; however, any length may be used. Network 702 may place Busy Reaching Window 706 centered on scheduled wake-up time 704 (in FIG. 7 centered O). Busy Reaching Window 706 length may be predetermined or configured and may be broadcast to the WTRUs via system information.

Busy Reaching Window 706 may be selected to be as short as may be possible to reduce overhead and inefficiency. Additionally, Busy Reaching Window 706 may not be employed if the WTRU clock does not drift.

At 710, WTRU 708 may know its clock drift direction. That is, WTRU 708 may know whether its clock may drift towards shorter time (−drift) or towards longer time (+drift). The adjustment window or the drift window may be used to compensate the long DRX cycle counting (i.e. add the drift length if the "−drift" and subtract the drift length if the "+drift"), so WTRU 708 may know or learn approximately when scheduled wake-up time 704 may be. WTRU 708 may then configure WTRY Busy Monitoring Window 716 around or centered the estimated the scheduled wake-up time, which may overlap the network busy reaching window for activity. WTRU Busy Monitoring Window 716 may be any length. For example, WTRU Busy Monitoring Window 716 may be one or one and one half or twice of the computed adjustment-window length.

At 712 and 714, WTRU 708 may not know the clock drift direction. WTRU 708 may set the length of a WTRU Busy Monitor Window, such as WTRU Busy Monitor Window 718 and WTRU Busy Monitor Window 720, to at least twice the computed adjustment window length. WTRU 708 may start the Busy Monitoring Window, such as at 722 and 724, one adjustment-window earlier than the scheduled wake up time, such as at 726 and 728, so that approximately half of the Busy Monitoring Window or one adjustment-window time may overlap with the network Busy Reach Window for activity. For example, WTRU Busy Monitor Window 718 and/or WTRU Busy Monitoring Window 720 may overlap with Network Busy Reaching Window 706.

During period of the Busy Reaching Window 706, network 702 may send paging or other signaling at the configured normal paging frames (PF) and paging subframe occasions (PO) in any of the SFN cycles within the period, which may be in addition to the PFs and POs in the scheduled SFN cycle. During the period of the Busy Monitoring Window, such as at 716, 718, and/or 720, WTRU 708 may perform the monitoring and reception of the scheduled network paging or signaling in any SFN cycle during the period in the PFs and POs configured by network 702 in terms of "paging" and signaling.

To assist this busy compensation method, network 702 may store information regarding WTRU 708 its associated adjustment-window length in an MME when the long sleep DRX or sleep is configured. For example, when a WTRU may be configured for long sleep, the network may save a copy of WTRU information and the adjustment-window-length in the MME node. This WTRU information may be used by the network to provide the busy window to the WTRU.

The WTRU may flag this long sleep nature of the operation and the possible clock drift rate related indication to the network when the WTRU registers with the network.

Network assisted SFN cycle adjustment methods may be provided. The network may provide information that may assist a WTRU that may have woken-up to self-adjust to the scheduled SFN cycle for the network paging or signaling.

The network may publish a SFN cycle order number within the Total-DRX-Definition-Period in the system information. This may be done, for example, so that when the long sleep WTRU wakes up, it may use the network published SFN cycle order number to align its own SFN cycle to the network SFN cycle number. The WTRU may then perform the monitoring of the PFs and POs in the right SFN cycle for the network paging or signaling.

The network may provide the current count-number/order-number of the SFN cycle (e.g. the $15^{th}$ or the $234^{th}$ SFN cycle within the Total-DRX-Definition-Period) to the public or to the MTC devices. When the long sleep WTRU wakes up, it may use the SFN cycle count-number/order-number from the system information to adjust its number/order of the SFN cycle with the systems. This count-number/order-number quantity in the system may take a $\log_2$ ($SCN_{inTotalDRXDefinitionPeriod}$) bit quantity in the SIB space, e.g. 18 bit for a wrap-around period in 31 days. Depending on the space the SCN order number may take and the urgency of WTRU realignment to the order of the SFN cycle, the system may publish it eight to sixteen times per SFN cycle evenly distributed.

Another method may be to have the system indicate a local SFN cycle (from 0 to $2^n-1$) order number it may be in (where n=1 or 2 or 3) to help the WTRU that may have woken up to figure out the SFN cycle number so as to tolerate the drift of 1, 2 and 4 SFN cycles. For example, if the WTRU may wake up at the SFN-0 of the beginning of SFN cycle 0 and let n=1, the network indication (which may be a SIB bit) of the SFN cycle order may be an alternating 0 and 1.

Figure 8:
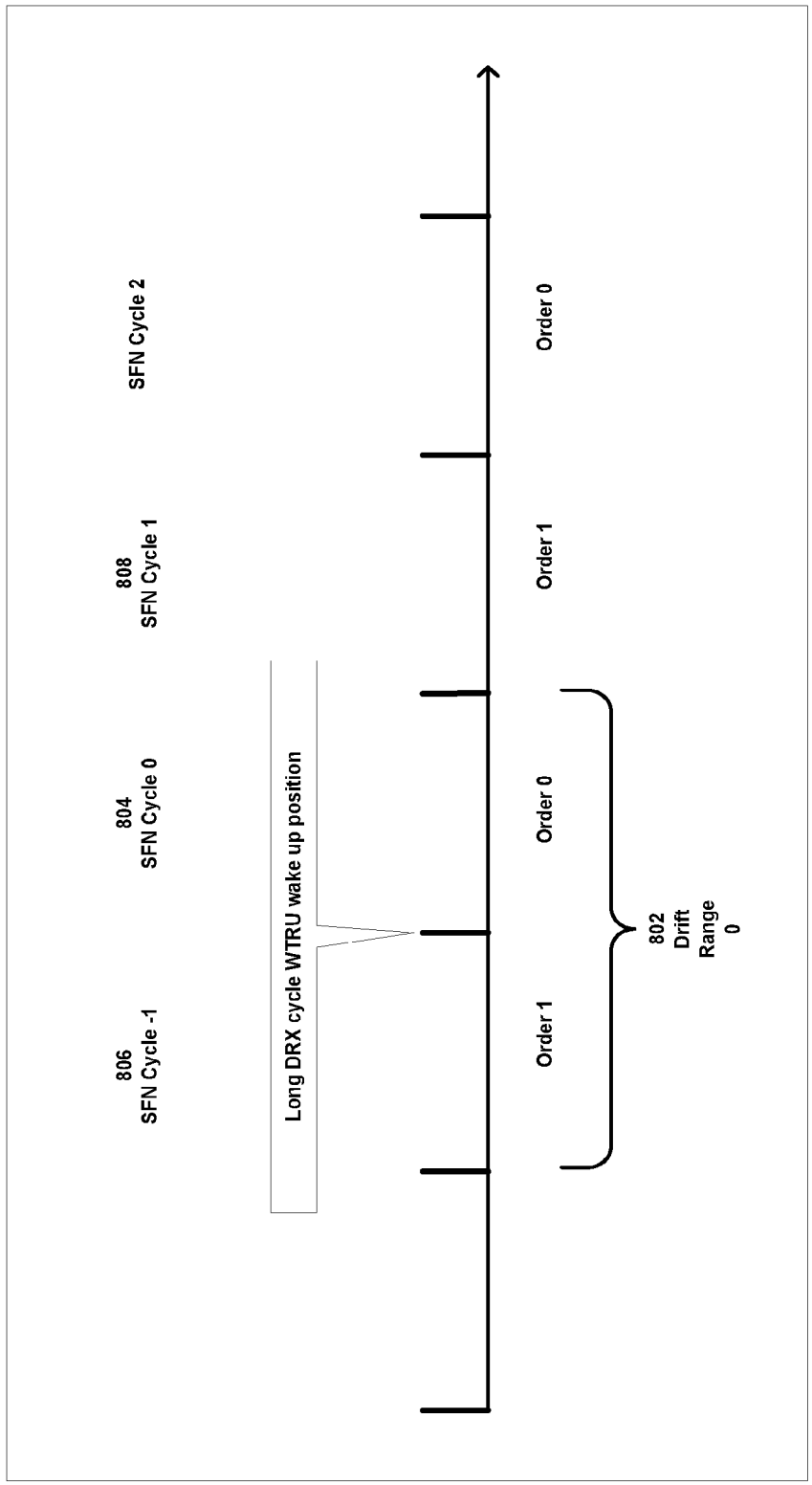
FIG. 8 depicts example SFN cycle order numbers 0 and 1.

FIG. 8 depicts local SFN cycle order number 0 and 1. For example, FIG. 8 shows a drift range 0 case at 802 that with a 0 on the SFN cycle 0 at 804, a 1 on SFN cycle 1 at 808, and a 1 on SFN cycle −1 at 806. If the WTRU wakes up and sees the network indicating a local-SFN cycle order value of 1, it may know it may be in the previous cycle, such as the SFN cycle −1 at 806. This may not be cycle 1 at 808, because cycle 1 at 808 may be beyond the basic clock drifting range assumption of no greater than ±1 SFN cycle.

Figure 9:
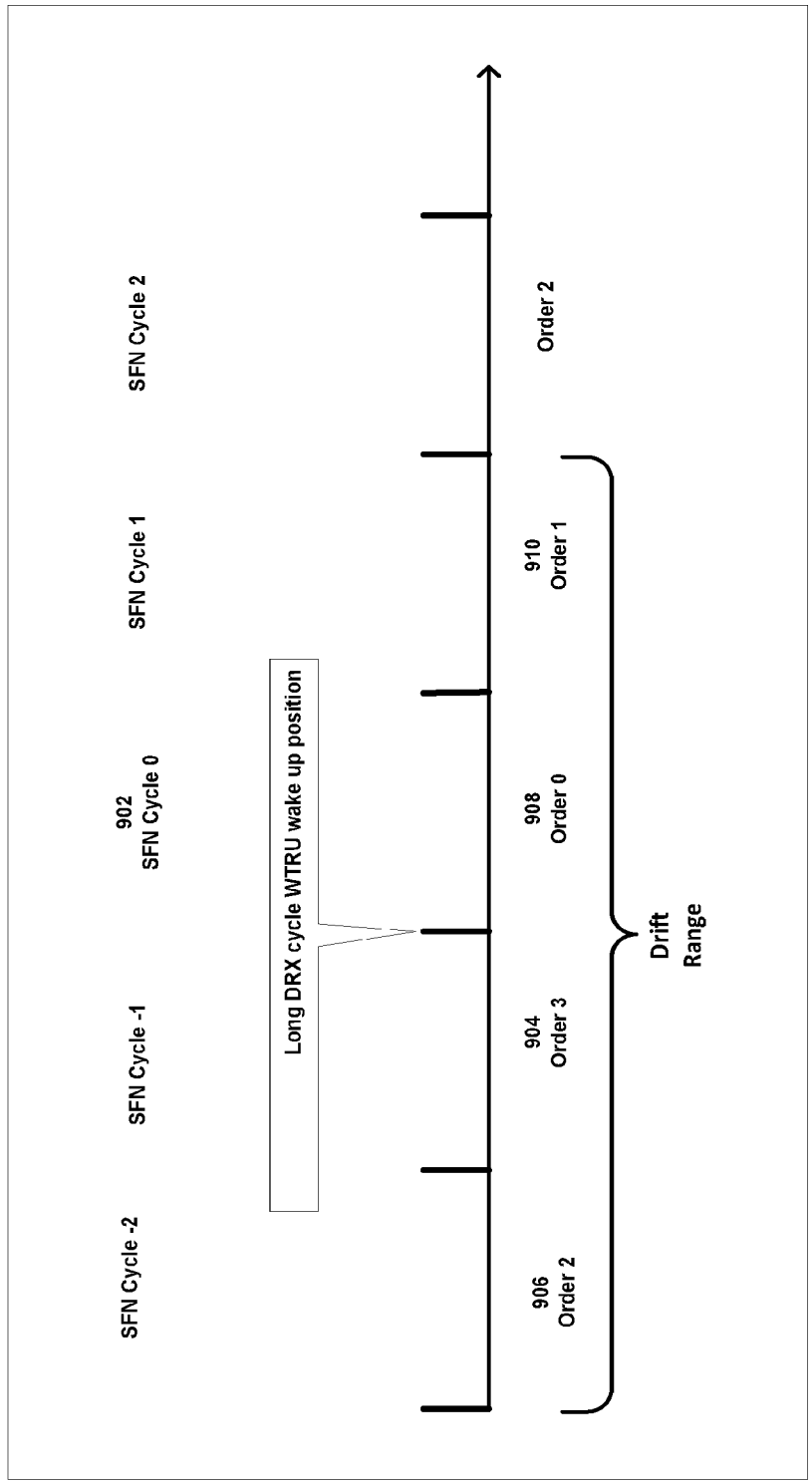
FIG. 9 depicts example local SFN cycle order numbers 0, 1, 2, and 3.

FIG. 9 depicts local SFN cycle order number 0, 1, 2, and 3. In the case that the drift range may be estimated larger than one full SFN cycle but less than two full SFN cycles, the 0 to $2^n-1$ (with n=2) local SFN cycle order number range configuration may be used, i.e. the local-SFN cycle order values would be 0, 1, 2 and 3. As shown in FIG. 9, using SFN 0 at SFN cycle 0 (shown at 902) as the reference wake-up time, a WTRU may see the local-SFN cycle order value 2 or 3 at 906 or 904 at wake-up and may know that the clock may be on the left (earlier) of the intended reference wake-up time over the time axis. A WTRU that may see a local SFN cycle order value 0 or 1 at 908 or 910 may know it is on the right (right or late) of the wake-up reference time. Using a localized-SFN cycle-number indication may cost less signaling overhead than the order number uses (e.g. 18 bits).

A system may provide time information. The network system or the eNB may provide the time+n-SFN cycle based long DRX cycle adjustment information to a MTC WTRU. For example, the eNB may provide SIB-8 or an equivalent for the time information. The eNB may provide the Nth SFN cycle order number in the intervals of a day or a half day or a time interval, such as a hour, minute, or the like via SIB or a message. A NAS may provide a universal time and a local time zone to a MTC device when the MTC device may access the network, such as a periodic TAU. A network may reuse EPS mobility management (EMM) information message or may include the universal time information element (IE) in the TAU accept message or other NAS message. The WTRU may obtain the time information using any of the methods described herein A WTRU may perform autonomous synchronization of SFN and/or SFN cycle. A SFN Sync Timer may also be pre-configured in a WTRU. The timer may be a configured fixed value or the timer value may be adjusted with respect to the cycle end based on previous measurement. When the timer expires, the WTRU may wake up, read and align the SFN, and may align the SFN cycle with the network.

The timer may be counting the SFN cycles; the value of the timer may be the integer times of SFN cycle. The value of the timer may ensure that the timing drift in the WTRU may not be greater than 512 radio frames before the timer expires. However, the timer may also be configured to stop at the turn of the SFN cycles (i.e. SFN=0), or stop in the middle of a SFN cycle or any other frame number within a SFN cycle.

If the SFN Sync timer for the WTRU expires (i.e. the WTRU "wakes up"), the SFN sync timer may be reset and restarted again at the SFN cycle boundary after WTRU goes back to sleep.

If the WTRU clock and the network clock may not or may not be estimated to drift apart beyond plus/minus 512 SFNs (±5.12 seconds), the MTC WTRU may resynchronize with the network by itself.

Self-recovery schemes described herein may be used if the estimated drift, or the computed adjustment window show that the clock drift may be within half (512 SFNs) of the SFN cycle.

Figure 10:
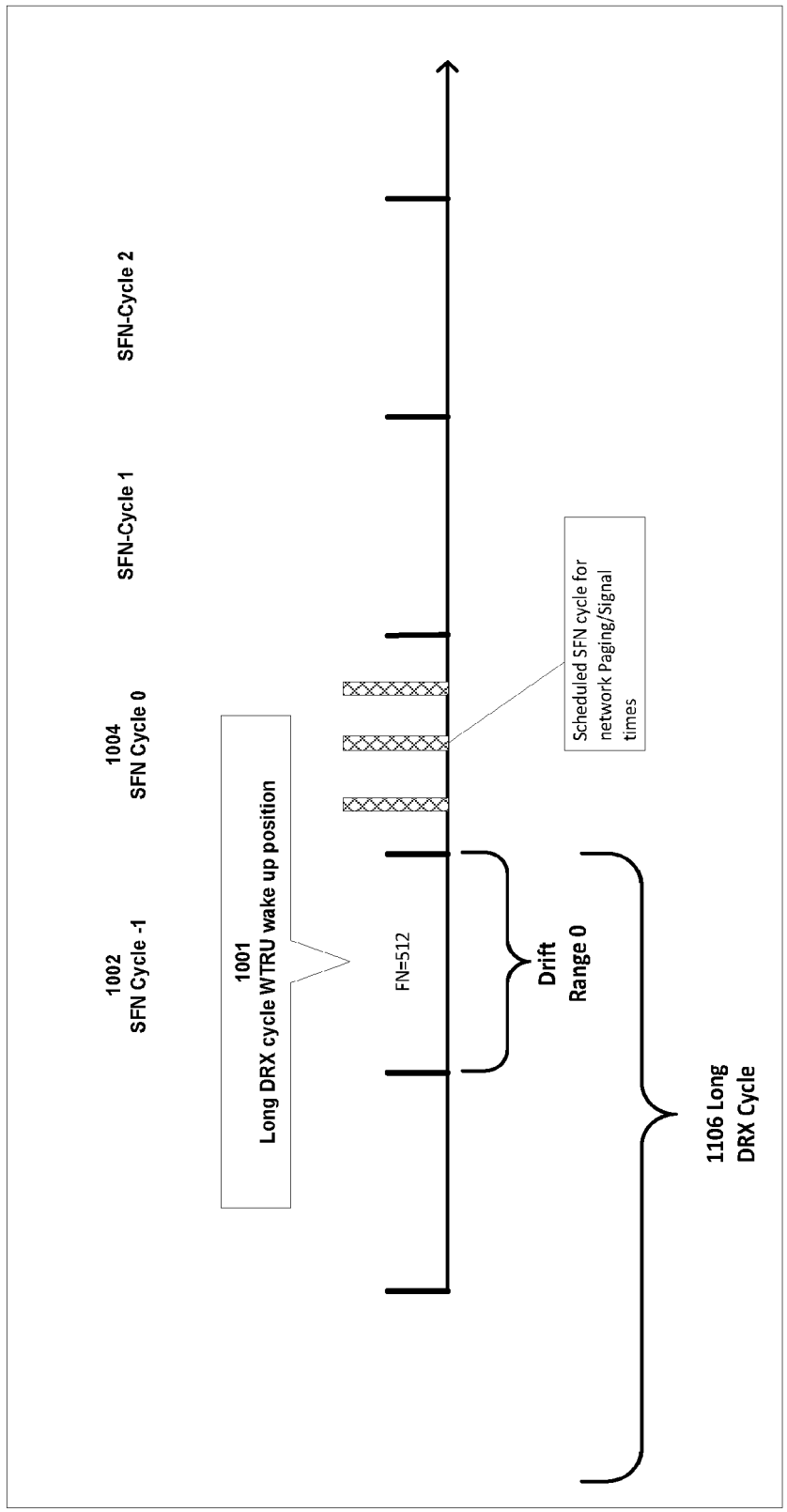
FIG. 10 depicts an example WTRU clock realignment.

FIG. 10 depicts WTRU clock realignment. At 1001, a WTRU may be scheduled during long DRX cycle 1006 to wake up in the middle of a SFN cycle, such as at SFN cycle −1 at 1002, which may be between frame number (FN) 500 to FN 524. This may be prior to SFN cycle 0 at 1004 where the network may be scheduled to send paging or signaling to the WTRU in the early half of the SFN cycle. The WTRU may align itself (its clocking) with the network on the LTE frame numbers via MIB and SIB acquisition. The WTRU may get ready to monitor/receive the network paging in the next SFN cycle (SFN cycle 0) on the PFs and POs scheduled and configured.

Figure 11:
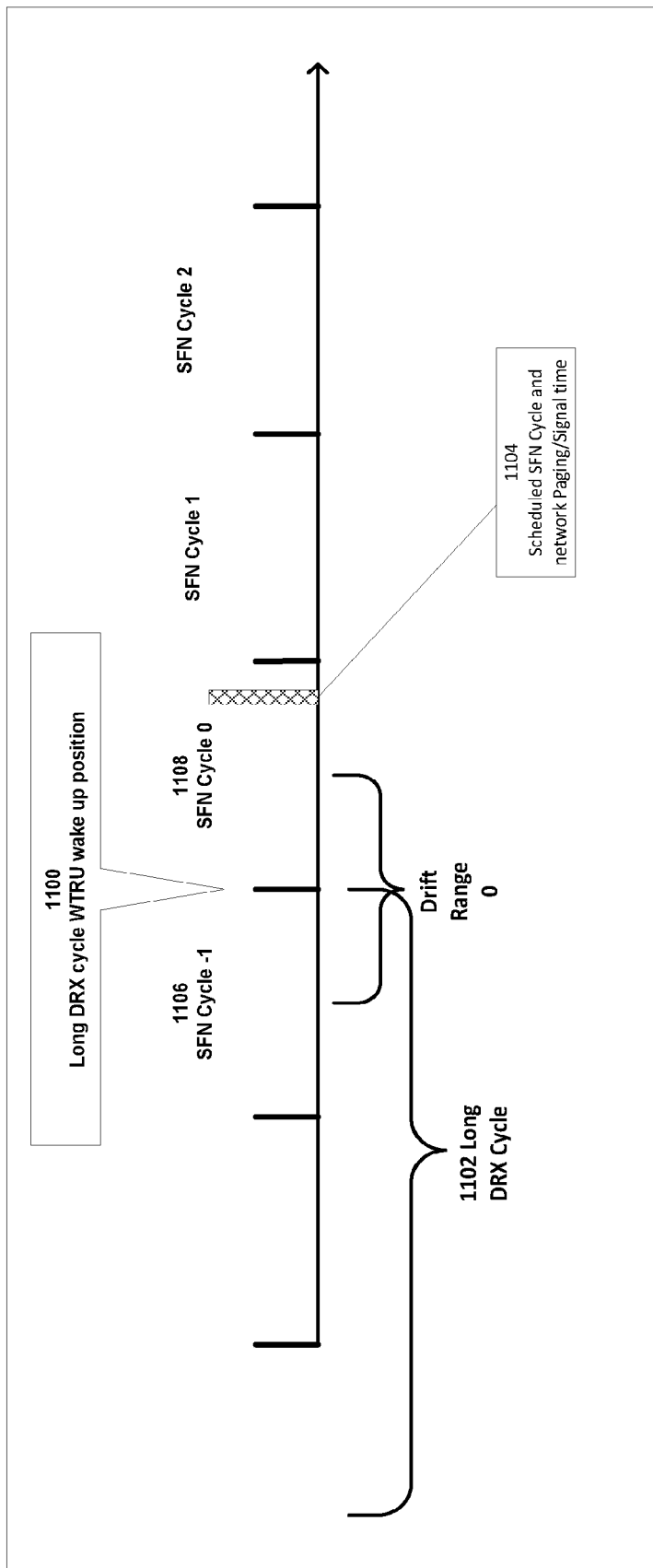
FIG. 11 depicts another example WTRU clock realignment.

FIG. 11 depicts another WTRU clock realignment. At 1100, a WTRU may be scheduled to wake up at the end of long DRX cycle 1102 to the SFN cycle (SFN cycle 0, SFN=0). The network may be scheduled to send paging or signaling to the WTRU in the latter half of the SFN cycle at 1104. When the sync timer expires and the WTRU may the network SFN, the SFN cycle may be aligned by comparing the stored SFN (=0) on the WTRU with the derived network SFN. If the derived SFN>=512, then the SFN cycle for the WTRU may fall in the previous SFN cycle (SFN cycle −1) for the network, such as at 1106. If the derived SFN<=512, then the WTRU and the network may be in the same SFN cycle (SFN cycle 0), at 1108. The WTRU may be able to adjust or confirm its SFN cycle and the LTE frame number, and may be ready to monitor/receive the network paging/signaling at the scheduled PF and PO.

Network paging coordination may be performed with respect to the receiving window. Upon the start of the receiving window (i.e. wake-up from the long sleep), the WTRU may follow camping procedures and may start monitoring the paging channel discontinuously. The paging cycle during the period of the receiving window may be the normal default paging cycle, or it may be the WTRU specific paging cycle. The paging occasion may be calculated.

If the network has a paging message waiting for the UE, it may delay the transmission of the paging message until the WTRU may be within the receiving window. The calculated start of the receiving window for the WTRU at the network side may not be exactly aligned with the start of the receiving window for the WTRU at the WTRU side due to the clock shift. By implementation, the network may start transmission in advance to the start of window and may extend the length of the window to make the paging delivery more reliable.

A network system may keep alive time. The system may depend on periodic TAU to know whether the concerned device may still be up to its designated or prescribed functions or technically alive. To preserve the keep-alive-time in the network system while implementing a long DRX cycle scheme, the longest periodic TAU timer may be longer than the longest long DRX cycle, for example, twice as long.

The MTC WTRU configured with the long DRX cycle may use the wake up time to perform the periodic TAU if the long periodic TAU timer expires between two scheduled wake-up times with one long DRX cycle.

Those MTC WTRUs that may usually be offline with the long DRX cycle may register or attach themselves with a flag that may indicate their long-dormant operational nature. The network system may then not rely on the periodic TAU to maintain their functional status. The monitoring of those MTC WTRUs may be the responsibility of the MTC-server or the relevant MTC-applications.

A MTC WTRU may have multiple applications running and a MTC server may know the status of those applications. The network or the MTC server may configure the MTC WTRU to report the status of a configured application. The report may be done in several ways. The MTC WTRU may report application status directly to MTC server on a PDN connection. The MTC WTRU may report application status using SMS. MTC application status may be combined with alive time method and the MTC application status may be attached in the NAS message. After receiving the MTC WTRU application status via a NAS message, a MME may forward the status report to MTC server. The MTC device may report application status by synchronizing its time with network when it access to the network.

A WTRU may be provided. The WTRU may include a processor that may be configured to perform a number of actions. For example, the processor may be configured to determine a cycle base unit type and a length of a long discontinuous reception (DRX) cycle. A number of base units of the cycle base unit type may be generated using the length of the long DRX cycle. The cycle base unit type may be an extended subframe number (SFN) cycle type, a time unit type, or the like.

The processor may be configured to generate the number of base units of the cycle base unit type using the length of the long DRX cycle in a number of ways. For example, the processor may determine n number of SFN cycles to be used for an extended SFN cycle type base unit. A number of extended SFN cycles to make up the length of the long DRX cycle may be generated. Each extended SFN cycle in the number of extended SFN cycles may include n SFN cycles. As another example, the processor may determine a length of time for the time unit type. A number of time units to make up the length of the long DRX cycle may be determined. The number of time units may be generated. Each time unit in the number of time units may include the length of time for the time unit type.

A long DRX cycle may be generated from the number of base units. For example, the long DRX cycle may be generated from the number of base units by generating the long DRX cycle from the number of extended SFN cycles.

A WTRU may be provided for determining when to receive a signal. The WTRU may include a processor that may be configured to perform a number of actions. For example, the processor may be configured to determine a system frame number cycle number (SCN) within a total DRX period. A long DRX cycle length may be determined. An offset SCN may be generated using the SCN and the long DRX cycle length. A page timing may be determined using the offset SCN. A paging signal may be received from a network using the page timing. A number of short DRX cycles may be determined to be used to receive the paging signal.

A long DRX cycle may be scheduled using the offset SCN and the long DRX cycle length. For example, the number of short DRX cycles may be scheduled within the long DRX cycle using the short DRX cycle length, before the long DRX cycle using the short DRX cycle length, after the long DRX cycle using the short DRX cycle length, or the like.

A number of short cycles may be scheduled and may be used to receive the paging signal. For example, a first long DRX cycle and a second long DRX cycle may be scheduled using the offset SCN and the long DRX cycle length. The number of short DRX cycles may be scheduled between the first long DRX cycle and the second long DRX cycle.

A WTRU for minimizing clock drift impact may be provided. The WTRU may include a processor that may be configured to perform a number of actions. For example, the processor may be configured to determine a long sleep length, a clock drift rate for the WTRU, and a wake-up time. An adjustment window may be generated using the long sleep length, the clock drift rate, and the wake-up time. A clock drift direction may be determined. A signal maybe received from a network using the adjustment window.

The processor may be configured to generate the adjustment window using the long sleep length, the clock drift rate, and the wake-up time. For example, the processor may determine the adjustment window using the long sleep length. The adjustment window may be scheduled using the wake-up time. The adjustment window may be adjusted using the clock drift rate such that a signal may be received from a network during the adjustment window.

As another example, the processor may be configured schedule the adjustment window using the wake-up time. A length of the adjustment window may be decreased using the clock drift rate when the clock drift direction indicates that a clock is drifting towards longer time. A length of the adjustment window may be increased using the clock drift rate when the clock drift direction indicates that a clock is drifting towards shorter time.

A WTRU may be provided to adjust a SFN cycle using assistance from a network. The WTRU may include a processor. The processor may be configured to receive a first system frame number (SFN) cycle order number from a network. The first SFN cycle order number may be received from the network via a system information. A second SFN cycle order number may be determined. A drift range may be calculated using the first SFN cycle order number and the second SFN cycle order number. The drift range may be used to receive a signal from the network. For example, the processor may be configured to receive a signal from the network in a next SFN cycle when the drift range indicates the network is scheduled to transmit the signal in the next SFN cycle.

The processor may be configured to align a local SFN cycle number with the first SFN cycle order number when the drift range indicates that first SFN cycle order number and the second SFN cycle order number may not be aligned. The aligned SFN cycle number may be used to receive a signal from the network using the aligned SFN cycle number.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit receive unit (WTRU), the method comprising:
   receiving a system information broadcast, the system information broadcast comprising a system frame number (SFN) cycle number (SCN);
   determining to monitor for a paging message during the SCN based on the SCN and a length of an extended discontinuous reception (DRX) cycle;
   determining one or more times associated with the SCN to monitor for the paging message based on a length of a second DRX cycle, wherein the length of the second DRX cycle is shorter than the length of the extended DRX cycle; and
   receiving at least one paging message in accordance with the monitoring.

2. The method of claim 1, wherein the determining to monitor for the paging message during the SCN is based further on an SCN offset value.

3. The method of claim 2, wherein the SCN offset value is determined based on information received from a network.

4. The method of claim 1, wherein the SCN corresponds to a count of SFN cycles.

5. The method of claim 4, wherein each SFN cycle of the SFN cycles corresponds to 1024 SFNs.

6. The method of claim 1, wherein the one or more times associated with the SCN to monitor for the paging message comprise a paging frame.

7. The method of claim 1, wherein the one or more times associated with the SCN to monitor for the paging message are associated with a paging receiving window.

8. The method of claim 7, wherein the paging receiving window is associated with a start time and a length.

9. A wireless transmit receive unit (WTRU) comprising a processor and memory, the processor and memory configured to:
   receive a system information broadcast, the system information broadcast comprising a system frame number (SFN) cycle number (SCN);

determine to monitor for a paging message during the SCN based on the SCN and a length of an extended discontinuous reception (DRX) cycle;

determine one or more times associated with the SCN to monitor for the paging message based on a length of a second DRX cycle, wherein the length of the second DRX cycle is shorter than the length of the extended DRX cycle; and receive at least one paging message in accordance with the monitoring.

10. The WTRU of claim 9, wherein the processor and memory are configured to determine to monitor for the paging message during the SCN based further on an SCN offset value.

11. The WTRU of claim 10, wherein the SCN offset value is determined based on information received from a network.

12. The WTRU of claim 9, wherein the SCN corresponds to a count of SFN cycles.

13. The WTRU of claim 12, wherein each SFN cycle of the SFN cycles corresponds to 1024 SFNs.

14. The WTRU of claim 9, wherein the one or more times associated with the SCN to monitor for the paging message comprise a paging frame.

15. The WTRU of claim 9, wherein the one or more times associated with the SCN to monitor for the paging message are associated with a paging receiving window.

16. The WTRU of claim 15, wherein the paging receiving window is associated with a start time and a length.

17. A base station comprising a processor and memory, the processor and memory configured to:

broadcast system information, the system information comprising a system frame number (SFN) cycle number (SCN);

determine that a paging message can be sent to a wireless transmit receive unit (WTRU) based on the SCN, where the determination is made based on the SCN and a length of an extended discontinuous reception (DRX) cycle for the WTRU;

determine one or more times associated with the SCN to send the paging message to the WTRU based on a length of a second DRX cycle for the WTRU, wherein the length of the second DRX cycle is shorter than the length of the extended DRX cycle; and send at least one paging message to the WTRU.

18. The base station of claim 17, wherein the one or more times associated with the SCN to send the paging message comprise a paging frame for the WTRU.

19. The base station of claim 17, wherein the processor and memory are configured to provide an SCN offset value.

* * * * *